United States Patent
Giuliano

(10) Patent No.: US 11,855,536 B2
(45) Date of Patent: Dec. 26, 2023

(54) POWER CONVERTERS, POWER SYSTEMS, AND SWITCH TOPOLOGIES

(71) Applicant: pSemi Corporation, San Diego, CA (US)

(72) Inventor: David Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 37 days.

(21) Appl. No.: 17/483,583

(22) Filed: Sep. 23, 2021

(65) Prior Publication Data

US 2023/0088177 A1  Mar. 23, 2023

(51) Int. Cl.
*H02M 3/158* (2006.01)
*H02M 1/00* (2006.01)
*H02M 3/07* (2006.01)

(52) U.S. Cl.
CPC ......... *H02M 3/158* (2013.01); *H02M 1/0058* (2021.05); *H02M 3/07* (2013.01)

(58) Field of Classification Search
CPC ....... H02M 3/158; H02M 1/0058; H02M 3/07
See application file for complete search history.

(56) References Cited

U.S. PATENT DOCUMENTS

| | | | |
|---|---|---|---|
| 7,777,459 B2 | 8/2010 | Williams | |
| 7,782,027 B2 | 8/2010 | Williams | |
| 7,786,712 B2 | 8/2010 | Williams | |
| 7,812,579 B2 | 10/2010 | Williams | |
| 7,977,927 B2 | 7/2011 | Williams | |
| 8,212,541 B2 | 7/2012 | Perreault et al. | |
| 8,724,353 B1 | 5/2014 | Giuliano et al. | |
| 9,917,517 B1* | 3/2018 | Jiang | H02M 1/34 |
| 10,193,441 B2 | 1/2019 | Giuliano | |
| 10,333,392 B2* | 6/2019 | Low | H02M 3/07 |
| 10,404,162 B2* | 9/2019 | Giuliano | H02M 7/25 |
| 10,608,530 B1* | 3/2020 | Zhu | H02M 3/07 |
| 10,651,731 B1* | 5/2020 | Rainer | H02M 3/1588 |
| 10,686,380 B2* | 6/2020 | Giuliano | H02M 3/07 |
| 10,848,070 B2* | 11/2020 | Li | H02M 3/3376 |
| 10,879,808 B2* | 12/2020 | Li | H02M 3/01 |

(Continued)

OTHER PUBLICATIONS

Gunasekaran Deepak et al: "A Variable (n/m)X Switched Capacitor DC-DC Converter", IEEE Transactions on Power Electronics, Institute of Electrical and Electronics Engineers, USA, vol. 32, No. 8, Aug. 1, 2017 (Aug. 1, 2017), pp. 6219-6235.

(Continued)

*Primary Examiner* — Rafael O De Leon Domenech
(74) *Attorney, Agent, or Firm* — Finnegan, Henderson, Farabow, Garrett & Dunner LLP

(57) ABSTRACT

Disclosed embodiments may include an integrated circuit (IC) for controlling a switched-capacitor power converter for converting voltage between first and second nodes to voltage between third and fourth nodes for use with a first plurality of switches, a second plurality of switches, a plurality of capacitors, and a plurality of resonance modules. The IC may include a controller that is configured to control the first plurality of switches to be closed and the second plurality of switches to be open to electrically connect the first node to the third node through a first one of the plurality of capacitors in series with a first one of the plurality of resonance modules.

31 Claims, 11 Drawing Sheets

(56) References Cited

U.S. PATENT DOCUMENTS

| | | | |
|---|---|---|---|
| 10,924,006 B1 | 2/2021 | Giuliano | |
| 10,972,010 B2* | 4/2021 | Cheng | H02M 3/07 |
| 2018/0205315 A1* | 7/2018 | Giuliano | H02M 3/07 |
| 2019/0006995 A1 | 1/2019 | Jurkov | |
| 2019/0334434 A1* | 10/2019 | Jong | H02M 3/158 |
| 2020/0186039 A1* | 6/2020 | Cheng | H02M 1/083 |
| 2020/0204070 A1* | 6/2020 | Schwabe | H02M 1/15 |
| 2020/0220461 A1* | 7/2020 | Pastorina | H02M 3/07 |
| 2021/0083571 A1 | 3/2021 | Giuliano et al. | |
| 2022/0060100 A1* | 2/2022 | Huang | H02M 3/01 |
| 2022/0190714 A1* | 6/2022 | Ye | H02M 3/07 |

OTHER PUBLICATIONS

Dong Cao et al: "Zero voltage switching double-wing multilevel modular switched-capacitor DC-DC converter with voltage regulation", Applied Power Electronics Conference and Exposition (APEC), 2013 Twenty-Eighth Annual IEEE, IEEE, Mar. 17, 2013 (Mar. 17, 2013), pp. 2029-2036.

Cao Dong et al: "A high voltage gain multilevel modular switched-capacitor DC-DC converter", 2014 IEEE Energy Conversion Congress and Exposition (ECCE), IEEE, Sep. 14, 2014 (Sep. 14, 2014), pp. 5749-5756.

Dong Cao et al: "A family of zero current switching switched-capacitor de-de converters", Applied Power Electronics Conference and Exposition (APEC), 2010 Twenty-Fifth Annual IEEE, IEEE, Piscataway, NJ, USA, Feb. 21, 2010 (Feb. 21, 2010), pp. 1365-1372.

Li Yanchao et al: "A 98.55% Efficiency Switched-Tank Converter for Data Center Application", IEEE Transactions on Industry Applications, IEEE Service Center, Piscataway, NJ, US, vol. 54, No. 6, Nov. 1, 2018 (Nov. 1, 2018), pp. 6205-6222.

Liu Wen Chuen et al: "Comparative Analysis on Minimum Output Impedance of Fixed-Ratio Hybrid Switched Capacitor Converters", 2019 20th Workshop on Control and Modeling for Power Electronics (COMPEL), IEEE, Jun. 17, 2019 (Jun. 17, 2019), pp. 1-7.

Jong Owen et al: "Resonant Switched-Capacitor Converter with Multi- Resonant Frequencies", 2019 IEEE Applied Power Electronics Conference and Exposition (APEC), IEEE, Mar. 17, 2019 (Mar. 17, 2019), pp. 2177-2184.

International Search Report and Written Opinion dated Nov. 29, 2022 in corresponding in International Application No. PCT/US2022/075963, 14 pages.

Cao, D., et al., "A Family of Zero Current Switching Switched-Capacitor DC-DC Converters", 2020 IEEE, pp. 1365-1372.

Cao, D., et al., "Multiphase Multilevel Modular DC-DC Converter for High-Current High-Gain TEG Application", 2011 IEEE Transactions on Industry Applications, vol. 47: No. 3. pp. 1400-1408.

Chen, W., et al., "A High Efficiency High Power Step-Up Resonant Switched-Capacitor Converter for Offshore Wind Energy Systems", 2012 IEEE, pp. 235-239.

Jong, O., et al., "Multi Resonant Switched-Capacitor Converters", Jan. 24, 2019, Faculty of the Virginia Polytechnic Institute and State University, 98 pages.

Shoyama, M., et al., "Resonant Switched Capacitor Converter with High Efficiency", 2004 35th Annual IEEE Power Electronics Specialists Conference, pp. 3780-3786.

Yeung, Y., et al, "Multiple and Fractional Voltage Conversion Ratios for Switched-capacitor Resonant Converters", 2001 IEEE, pp. 1289-1294.

"Chapter 19 Resonant Conversion", https://www.ieee.li/pdf/introduction_to_power_electronics/chapter_19.pdf, Fundamentals of Power Electronics, 87 pages.

* cited by examiner

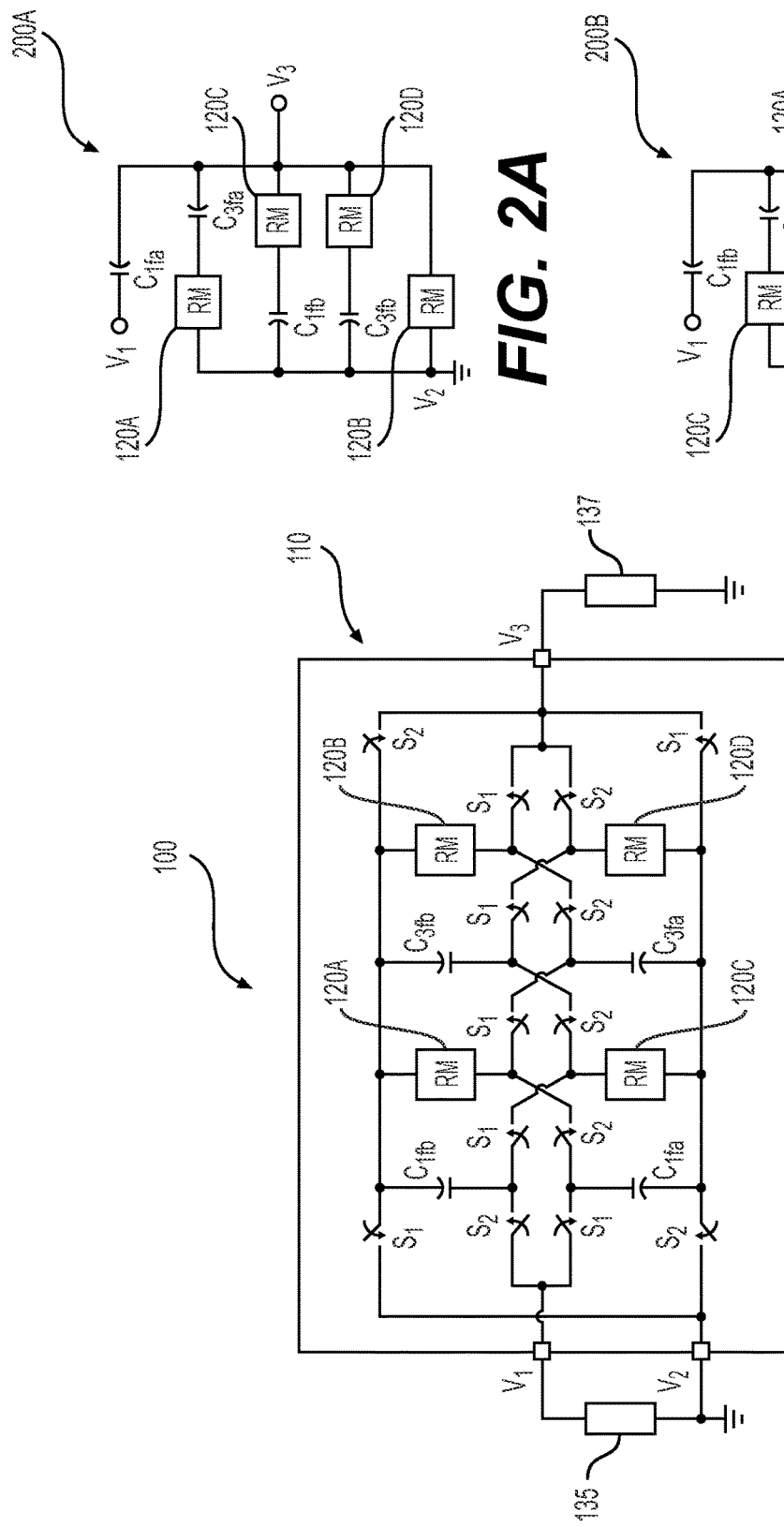

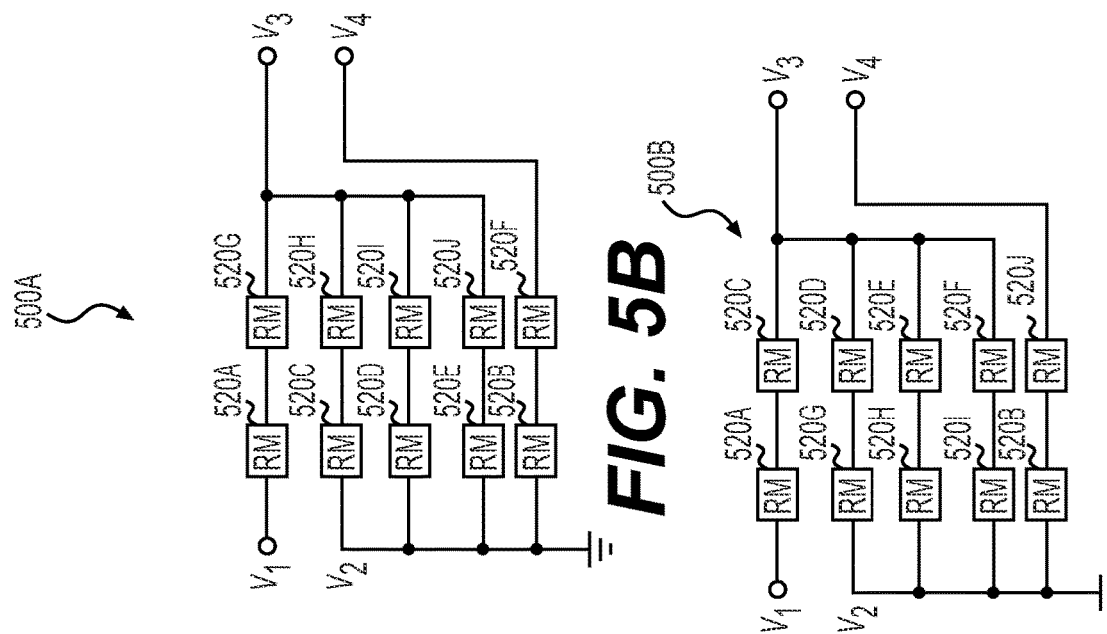
FIG. 5B
FIG. 5C
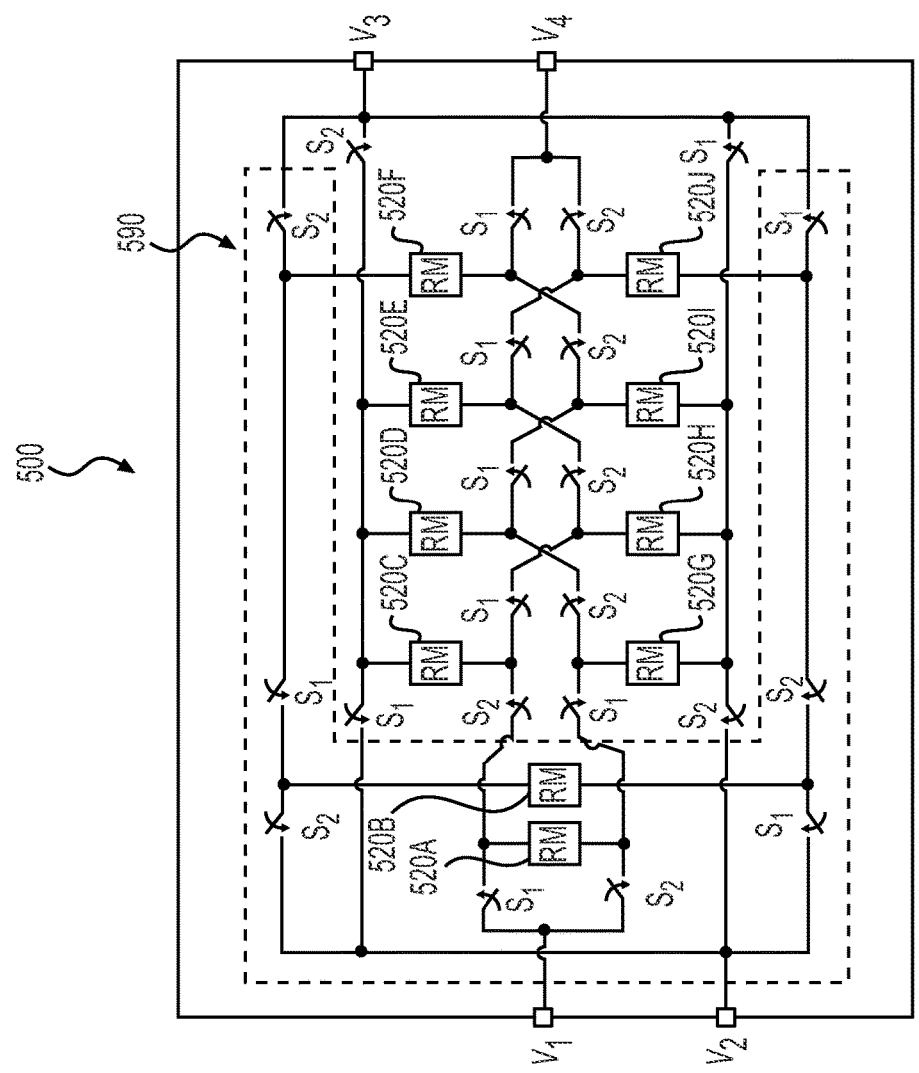
FIG. 5A

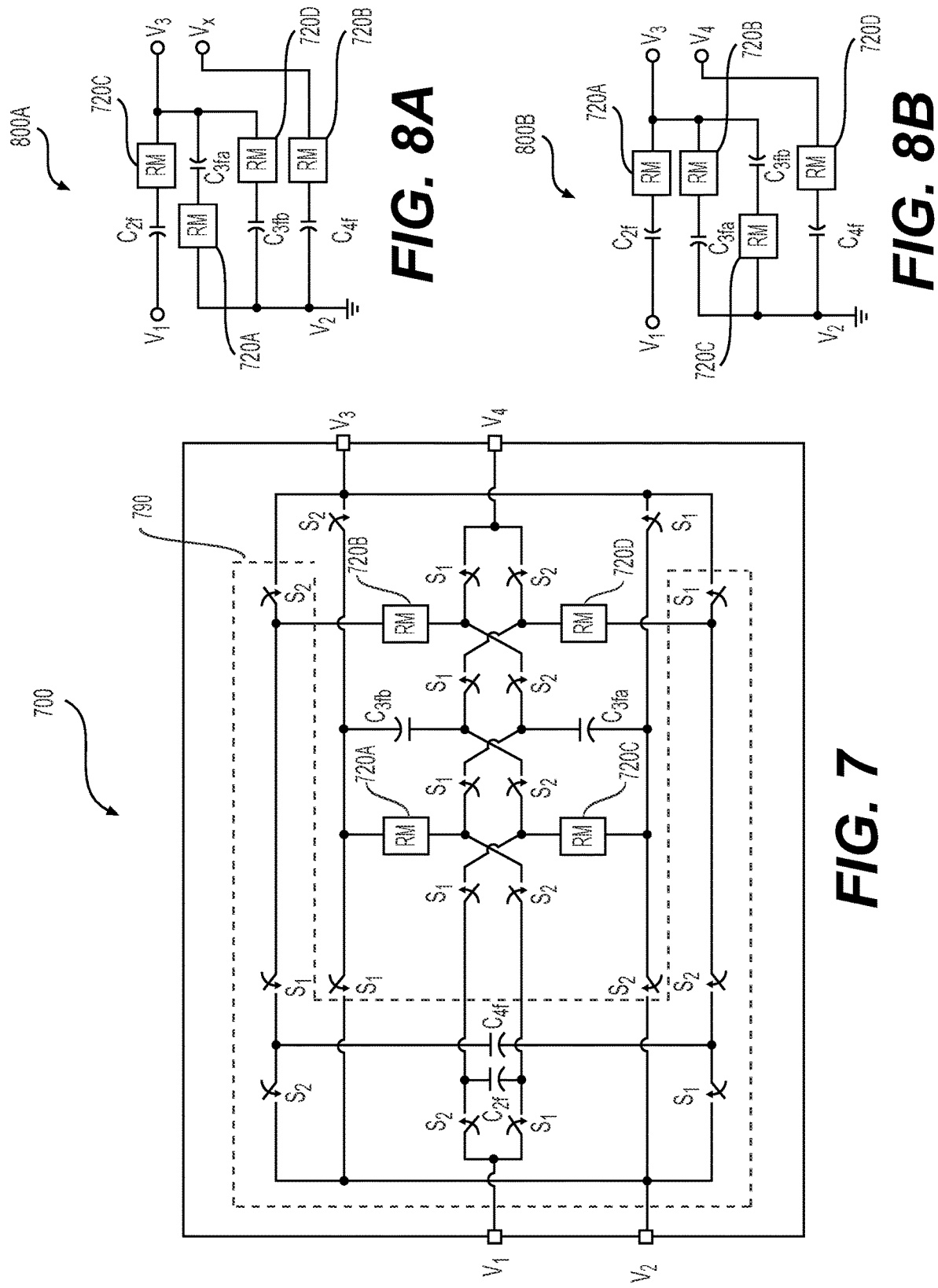

POWER CONVERTERS, POWER SYSTEMS, AND SWITCH TOPOLOGIES

TECHNICAL FIELD

The present disclosure generally relates to power electronic devices. More particularly, the present disclosure relates to DC-DC power converters.

BACKGROUND

Many electronic products, particularly mobile computing and/or communication products and components (e.g., notebook computers, ultra-book computers, tablet devices, LCD and LED displays), require multiple voltage levels. For example, radio frequency transmitter power amplifiers may require relatively high voltages (e.g., 12V or more), and logic circuitry may require a low voltage level (e.g., 1-2V). Some other circuitry may require an intermediate voltage level (e.g., 5-10V). Power converters are often used to generate a lower or higher voltage from a common power source, such as a battery, in order to meet the power requirements of different components in the electronic products.

SUMMARY

Embodiments of the present disclosure provide a power converter. Disclosed embodiments may include an integrated circuit (IC) for controlling a switched-capacitor power converter for converting voltage between first and second nodes to voltage between third and fourth nodes for use with a first plurality of switches, a second plurality of switches, a plurality of capacitors, and a plurality of resonance modules. The IC may include a controller that is configured to control the first plurality of switches to be closed and the second plurality of switches to be open to electrically connect the first node to the third node through a first one of the plurality of capacitors in series with a first one of the plurality of resonance modules.

Disclosed embodiments may include an integrated circuit (IC) for controlling a switched-capacitor power converter for converting voltage between first and second nodes to voltage between third and fourth nodes for use with a first plurality of switches, a second plurality of switches, a plurality of capacitors, and a plurality of resonance modules. The IC may include a controller configured to control the first plurality of switches to be closed and the second plurality of switches to be open to electrically connect the first node to the third node through a first one of the plurality of resonance modules. A ratio of a voltage across the first and second nodes to a voltage across the third and fourth nodes may be an even ratio. The power converter may be multi-resonant.

Disclosed embodiments may include an integrated circuit (IC) for controlling a switched-capacitor power converter for converting voltage between first and second nodes to voltage between third and fourth nodes for use with a first plurality of switches, a second plurality of switches, and a plurality of resonance modules. The IC may include a controller configured to control the first plurality of switches to be closed and the second plurality of switches to be open to electrically connect the first node to the third node through a first one of the plurality of resonance modules. The power converter may be multi-resonant.

Disclosed embodiments may include an integrated circuit (IC) for controlling a switched-capacitor power converter for converting voltage between first and second nodes to voltage between third and fourth nodes for use with a first plurality of switches, a second plurality of switches, a plurality of capacitors, and a plurality of resonance modules. The IC may include a controller configured to control the first plurality of switches to be closed and the second plurality of switches to be open to electrically connect the first node to the third node through a first one of the plurality of resonance modules in series with a second one of the plurality of resonance modules.

Disclosed embodiments may further include switched capacitor power converters and methods for controlling switched-capacitor power converters. The switched-capacitor power converters may include a first plurality of switches, a second plurality of switches, a plurality of capacitors, and/or a plurality of resonance modules. The integrated circuits and power converters may be bidirectional.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

BRIEF DESCRIPTION OF THE DRAWINGS

Embodiments and various aspects of the present disclosure are illustrated in the following detailed description and the accompanying figures. It is noted that, in accordance with standard practice in the industry, various features are not drawn to scale. In fact, the dimensions of the various features may be arbitrarily increased or reduced for clarity of discussion.

FIG. 1 is a diagram illustrating an exemplary power converter, in accordance with some embodiments of the present disclosure.

FIGS. 2A and 2B are diagrams illustrating example configurations of the exemplary power converter of FIG. 1, in accordance with some embodiments of the present disclosure.

FIG. 5A is a diagram illustrating an exemplary power converter, in accordance with some embodiments of the present disclosure.

FIGS. 5B and 5C are diagrams illustrating example configurations of the exemplary power converter of FIG. 5A, in accordance with some embodiments of the present disclosure.

FIG. 7 is a diagram illustrating an exemplary power converter, in accordance with some embodiments of the present disclosure.

FIGS. 8A and 8B are diagrams illustrating example configurations of the exemplary power converter of FIG. 7, in accordance with some embodiments of the present disclosure.

DETAILED DESCRIPTION

Figure 3A:
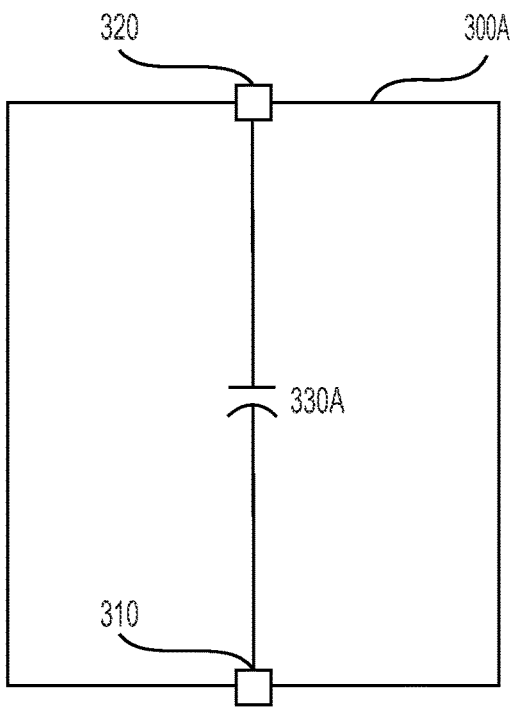
FIGS. 3A, 3B, 3C, and 3D are diagrams illustrating example first modules (e.g., resonance modules), in accordance with some embodiments of the present disclosure.

The following disclosure provides many different exemplary embodiments, or examples, for implementing different features of the provided subject matter. Specific simplified examples of components and arrangements are described below to explain the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Throughout the figures, components may be referenced using a combination of alphanumeric characters, some of which may include subscripts. Within this specification, the subscripts may be formatted as plain characters. For example, "$V_1$" from the figures may be referred to as "V1" within the specification. As another example, "$C_{2fa}$" from the figures may be referred to as "C2fa" within the specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this document, the term "coupled" may also be termed as "electrically coupled," and the term "connected" may be termed as "electrically connected." "Coupled" and "connected" may also be used to indicate that two or more elements cooperate or interact with each other.

Throughout this disclosure, embodiments are discussed in relation to particular electrical components, such as capacitors and inductors. Although an individual component may be discussed (e.g., a single capacitor, a single inductor), a combination of multiple components may be substituted for the single component. For example, while a single capacitor may be discussed or depicted, two or more capacitors (e.g., in series, parallel, or a combination of the two) may be substituted so long as the required qualities remain the same. In this example, an embodiment that calls for a single 20 mF capacitor may use two capacitors of 10 mF in parallel instead. Similar substitutions may be made for inductors.

Various embodiments of the present disclosure will be described with respect to embodiments in a specific context, such as a switched capacitor power converter. As used in this disclosure, the term "switched capacitor converter" may refer to a switched-capacitor network configured to convert an input voltage to an output voltage. The network may use switches to change between two or more circuit configurations to alter the voltage between the input and output terminals. Although not discussed in detail herein, disclosed embodiments may rely on level shifters and gate drivers to control the switches between open and closed states. Disclosed embodiments may operate using varying switching frequencies, such as 50 kHz to 500 MHz.

Disclosed embodiments may address challenges with the design of switched capacitor converters. As one example challenge, system design requirements may require converting voltages at both odd and even ratios. In some instances, the input voltage a system has available may be an odd ratio of the voltage required by certain electrical components of the system. For example, a system may be supplied an input voltage of 10 volts and include components that need to be supplied a voltage of 2 volts. In this example, the ratio of the input voltage to the output voltage forms an odd ratio, specifically a 5:1 ratio. Certain switched capacitor converters may be designed for even ratios (e.g., 2:1, 4:1, 6:1, 8:1), which may make their underlying topology unsuitable for odd voltage conversion ratios (e.g., 5:1, 7:1, 9:1). Disclosed embodiments may address this issue by providing switched capacitor topologies that are suitable for odd voltage ratios instead of, or in addition to, even voltage ratios.

As another challenge, disclosed embodiments may provide single-resonance and multi-resonant switched capacitor converters. Resonant converters (both single-resonance and multi-resonant) are switched capacitor systems that may include inductors that resonate with the capacitors. The combination of the capacitor and inductor may create an oscillating (e.g., sinusoidal) current magnitude across the capacitor, and switching may occur when the oscillating current reaches zero. Switching when the current is zero, or zero-current switching, can result in significant gains in power conversion efficiency for switched capacitor converters.

Single-resonance and multi-resonant converters can differ in the current across the capacitors in the respective systems over time. In single resonance converters, the current across the capacitors over time forms a sinusoidal pattern (e.g., a sine wave), whereas the current across the capacitors over time in multi-resonant converters can include harmonics. For example, in multi-resonant converters, the waveform of the current through the capacitors over time may include odd harmonics, such as the first, third and fifth harmonics. By including harmonics, the Multi-resonant converters have current through capacitors look more like square wave. The root-mean square (RMS) value of a square wave current is less than that of a sine wave current. Because the loss in the system (e.g., conduction loss through switches) is derived from the RMS current squared, systems with lower RMS current, such as multi-resonant converters, are more efficient, while still providing the same amount of power. With reduced switching loss, power converters may be able to operate efficiently at higher switching frequencies.

Disclosed embodiments may also provide symmetric systems. For example, switched capacitor converters may alternate between two configurations based on switch states. When the routes between the each of the input terminals and each of the output terminals include the same type of components, the converter may be considered "symmetric." In other words, "symmetric" or "symmetrical" systems provide equivalent components arranged in equivalent electrical paths in both switch states. To be equivalent components, two components may not be the exact same component (e.g., the same capacitor) but they may have the same qualities (e.g., in the example of a capacitor, a capacitor or a capacitance with the same or similar or different capacitance). In some embodiments, a symmetrical system may include equivalent components but alter the series order of the components in each switch state. For example, in a first switch state, two nodes may be connected by a capacitor and inductor in series, in that order. In a second switched state the same two nodes may be connected by an equivalent capacitor and an equivalent inductor (e.g., not necessarily the same capacitor or inductor, but a capacitor and inductor with similar qualities as those in series in the first switch state) but the relative order of the two components may change, such as the two nodes being electrically connected by the equivalent inductor and equivalent capacitor in series, in that order. Having a system be symmetrical may allow the system to be easier to design and lay out. Additional benefits may include having circuit elements be the same components, having parasitics cancelling out, having less variation in component values. And when more of the same or similar components are used, as the components age, they will derate similarly.

FIG. 1 is a diagram illustrating an exemplary system 100, in accordance with embodiments of the present disclosure, System 100 may include converter 110, source 135, and/or load 137. Although not shown, system 100 and/or converter 110 may include a controller.

In embodiments, power converter may include terminal V1, terminal V2, terminal V3, a first group of switches S1, a second group of switches S2, capacitors C1$fb$, C1$fa$, C3$fb$, C3$fa$, and first modules 120A, 120B, 120C, 120D (shown as "RM" in FIG. 1). In some embodiments, first modules 120A, 120B, 120C, and 120D may allow power converter 110 to resonate and may be referred to as "resonance modules." Power converter 110 may interface with voltage source 135 through input terminals V1 and V2 and may provide power to load 137 through output terminal V3. In some embodiments, although not shown, power converter 110 may be bidirectional, and load 137 may be connected to terminals V1 and V2, with voltage source 135 connected to terminal V3. In other words, in some embodiments, terminal V3 may serve as either an input or an output terminal. Although the term "terminal" is used to describe V1, V2, and V3, they may also be nodes within the electrical system. For example, in addition to being physical connection terminals or ports, V1, V2, and/or V3 may be locations within an electrical circuit, such as a point along a copper trace of a printed circuit board. Moreover, the term "terminal" throughout this disclosure may refer to a physical port or terminal, as well as a node or location within an electrical circuit. "Terminal" may be substituted for "node" and vice versa.

Power converter 110 may convert the voltage from voltage source 135 to provide a different voltage to load 137. The conversion process may be performed using a switched capacitor network. In some embodiments, two groups of switches may be used to create two alternative configurations of the circuit or two alternative paths. For example, as shown, switches S1 and S2 may be used to create two different configurations. In one configuration, switches S1 may be open and switches S2 may be closed. In another configuration, switches S2 may be open and switches S1 may be closed. in embodiments, in between the two difference configurations, there may exist a state called deadtime, during which switches S1 and switches S2 are both open. Other switching configurations may be used consistent with this disclosure.

FIGS. 2A and 2B are diagrams illustrating example configurations 200A and 200B of the exemplary power converter 110 of FIG. 1, in accordance with some embodiments of the present disclosure. As shown in FIG. 2A, configuration 200A may be formed when switches S1 of power converter 110 are closed (e.g., completing an electrical path) and switches S2 of power converter 110 are open (e.g., disconnecting an electrical path). As shown in FIG. 2B, configuration 200B may be formed when switches S2 are closed and switches S1 are open.

The switches may connect different components between the terminals. In some embodiments, power converter 110 may include capacitors as components between the terminals. For example, as shown in FIG. 1, power converter 110 may include capacitors C1$fb$, C1$fa$, C3$fb$, and C3$fa$. Capacitors C1$fb$, C1$fa$, C3$fb$, and C3$fa$ may be any device that stores electrical energy in an electric field. They may be fixed (nonvariable) capacitors or polarized capacitors, and can come in packages, such as discrete components (e.g., surface mount device (SMD) packages, through-hole packages) or integrated into a silicon die (e.g., integrated on-chip). Other types of capacitors may be used as described throughout this disclosure, such as multi-layer ceramic capacitors (MLCC), for example.

In some embodiments, power converter 110 may include first modules as components between the terminals. For example, as shown in FIG. 1, power converter 110 may include first modules 120A, 120B, 120C, and 120D. While depicted as a function block labeled with "RM" in FIG. 1 (and in other figures throughout this disclosure), first modules may come in varying forms. Regardless of their composition, first modules may be components that allow a switched capacitor converter to resonate, either on their own or in combination with other components. For example, within a switched capacitor converter, when an inductor is paired with each capacitor in series, the converter can resonate. As previously discussed in this disclosure, resonant converters (e.g., single-resonance, multi-resonant) provide increased conversion efficiency. Therefore, including first modules may provide significant efficiency improvements to switched capacitor converters.

FIGS. 3A, 3B, 3C, and 3D are diagrams illustrating example first modules 300A, 300B, 300C, and 300D, respectively, in accordance with some embodiments of the present disclosure. The depicted components may be examples of what is referred to as a first module throughout this disclosure. In embodiments, first modules 300A, 300B, 300C, and 300D may cause a power converter to resonate and may be referred to as resonance modules. As shown in each of FIGS. 3A, 3B, 3C, and 3D, instances of first modules 300A, 300B, 300C, and 300D may include terminals 310 and 320, which may electrically connect the module to other circuit components. As previously explained, although a single electrical component (e.g., a single inductor) may be shown, multiple components in series or parallel (e.g., multiple inductors) may be used instead, so long as the desired component characteristics are maintained (e.g., in the case of inductors, the desired inductance).

FIG. 3A is a diagram of example first module 300A, in accordance with some embodiments of the present disclosure. In some embodiments, first module 300A may include a capacitor. For example, as shown, first module 300A may include capacitor 330A, having one conductor connected to terminal 310 and the other conductor connected to terminal 320. Although a capacitor, by itself, may not allow a converter to resonate, this module is referred to as a "resonance" module because it may be combined with an inductor (e.g., outside the first module 300A), which may create resonance.

Figure 3B:
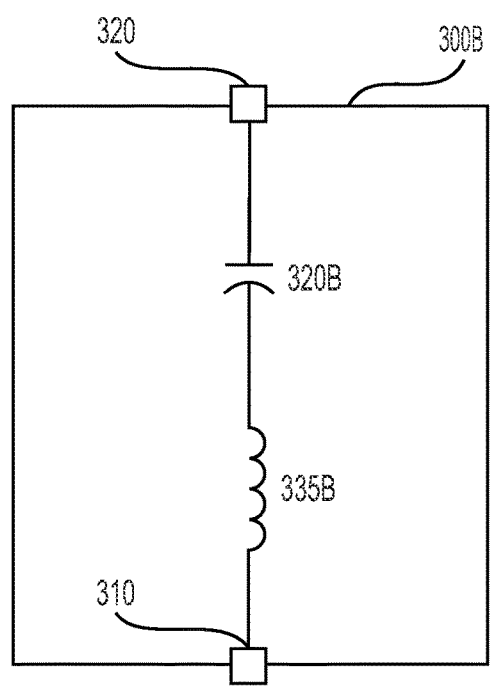

FIG. 3B is a diagram of example first module 300B, in accordance with some embodiments of the present disclosure. In some embodiments, first module 300B may include a capacitor and an inductor (e.g., a discrete inductor, a trace inductor, or a parasitic inductor). For example, as shown in FIG. 3B, first module 300B may include capacitor 320B in series with inductor 335B. Although inductor 335B is shown being connected to terminal 310 and capacitor 320B is shown being connected to terminal 320, the components may be switched so that inductor 335B is connected to terminal 320 and capacitor 320B is connected to terminal 310. This particular arrangement of capacitors and an inductor may allow for a single resonant frequency in a switched capacitor converter, also referred to as a single-resonance switched capacitor converter.

Figure 3C:
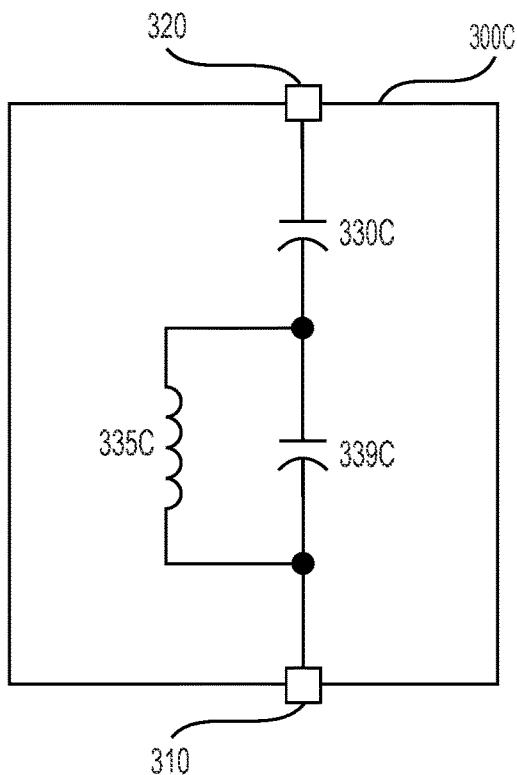

FIG. 3C is a diagram of example first module 300C, in accordance with some embodiments of the present disclosure. In some embodiments, first module 300C may include two capacitors and one inductor. For example, as shown in FIG. 3C, first module 300C may include capacitor 339C connected in parallel with inductor 335C, with the parallel combination in series with capacitor 330C. This particular arrangement of capacitors and an inductor may allow for multiple resonances in a switched capacitor converter, also referred to as a multi-resonant switched capacitor converter.

Figure 3D:
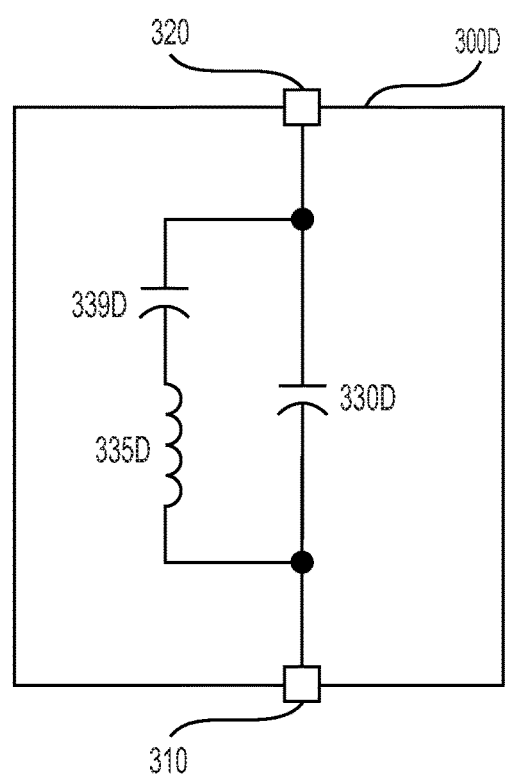

FIG. 3D is a diagram of example first module 300D, in accordance with some embodiments of the present disclosure. In some embodiments, first module 300D may include two capacitors and one inductor. For example, as shown in FIG. 3D, first module 300D may include capacitor 339D in series with inductor 335D, with capacitor 330D in parallel with the series combination. This particular arrangement of capacitors and an inductor may allow for multiple resonances in a switched capacitor converter, also referred to as a multi-resonant switched capacitor converter.

FIGS. 1, 2A, 2B, 4A, 4B, 4C, 5A, 5B, 5C, 6A, 6B, 6C, 7, 8A, 8B, 9, 10A, 10B, 11, 12A, 12B include references to first modules generally and the references to reference module or "RM" should not be limit a disclosure to any particular type of first module unless explicitly stated. In some embodiments, all first modules in a power converter may be the same type. For example, each of first modules 120A, 120B, 120C, and 120D in FIG. 1 may be first module 300B of FIG. 3B. In other embodiments, the first modules of a disclosed power converter may all not be the same and, instead, may correspond to different modules. For each, each of first modules 120A, 120B, 120C, and 120D in FIG. 1 may be any of first modules 300A, 300B, 300C, or 300D.

Returning to FIGS. 1, 2A, and 2B, configurations 200A and 200B of the exemplary power converter 110 may create alternate paths between input terminals V1 and V2 and output terminal V3. Switching between the two configurations at a given frequency may allow power converter to step-down the voltage across input terminals V1 and V2. The particular circuitry depicted in FIG. 1 may create a 5:1 voltage conversion ratio. While this particular design offers the beneficial quality of an odd voltage conversion ratio, the inventors recognized that it may not resonate. This is because in each switch configuration (e.g., configurations 200A and 200B), an input terminal is connected to an output terminal with only a capacitor. For example, in configuration 200A, input terminal V1 is connected to output terminal V4 through only capacitor C1fa. Similarly, in configuration 200B, input terminal V1 is connected to output terminal V4 through only capacitor C1fb. The inventors recognized that, because in each of configurations 200A and 200B there is no inductor in series with the capacitor connected to the input terminal V1, power converter 110, such as the legs containing only a capacitor, may not resonate.

FIG. 4 is a diagram illustrating an exemplary power converter 400, in accordance with some embodiments of the present disclosure. Converter 400 may include input terminals V1 and V2, output terminals V3 and V4, first modules 420A, 420B, 420C, and 420D, capacitors C2fa, C2fb, and C4fa, C4fb, switches S1, and switches S2. Although not shown, in some embodiments, converter 400 may be connected to a voltage source and load. For example, a voltage source may be connected across input terminals V1 and V2, and a load may be connected to output terminals V3 and V4. In some embodiments, converter 400 may be bidirectional. Therefore, while the terms "input terminal" and "output terminal" are used, each terminal (or node) may serve to connect to a power supply, a load, or both in embodiments. Although not shown, power converter 400 may be connected to a controller, such as an integrated circuit. The controller may control the state of switches S1 and S2. As shown, converter 400 adds circuitry 490 to converter 110 of FIG. 1. The additional circuitry 490 increases the functionality of converter 110, such as by converting voltage at even ratios.

Power converter 400 may convert the voltage provided at input terminals V1 and V2 to provide a different voltage at output terminals V3 and V4. For example, the topology of power converter 400 may create an even voltage conversion ratio, such as a 4:1 ratio of the input voltage (e.g., across input terminals V1 and V2) to the output voltage (e.g., across output terminals V3 and V4). Additional capacitors, switches, and first modules (e.g., resonance modules) may be added outside of circuitry 490 and connected to it to alter the conversion ratio. For example, another column of capacitors and another column of first modules, connected with a similar switching arrangement as first modules 420C and 420D and capacitors C2*fa* and C2*fb*, may be added to increase the voltage ratio (e.g., to a 6:1 or 8:1 ratio). The conversion process may be performed using a switched capacitor network. In some embodiments, two groups of switches may be used to create two alternative configurations of the circuit or two alternative paths. For example, as shown switches S1 and S2 may be used to create two different configurations. In one configuration, switches S1 may be open and switches S2 may be closed. In another configuration, switches S2 may be open and switches S1 may be closed. Other switching configurations may be used consistent with this disclosure. The inventors recognized that additional circuitry 490 may be coupled with a portion of the circuitry of converter 110 of FIG. 1 to increase its functionality. For example, circuitry 490 adds switches to each of switches S1 and S2, along with first modules 420A and 420B. In addition to the selection and placement of these components for circuitry 490, the inventors identified particular nodes for connecting the circuitry 490 to converter 110. The combination may result in new functionality, such as even voltage conversion ratios and a converter that has single resonance or is multi-resonant, depending upon the type of first module selected.

Power converter 400 may utilize a combination of capacitors and first modules. In some embodiments, power converter 400 may utilize the same number of first modules as capacitors, such as four capacitors and four first modules, as shown. For example, power converter may include first modules 420A, 420B, 420C, and 420D that are connected through a switching topology with capacitors C2*fa*, C2*fb*, C4*fa*, and C4*fb*. The capacitors may be the same example capacitors previously discussed in this disclosure. The first modules may be one of the example first modules previously discussed in this disclosure (e.g., first module 300A of FIG. 3A, first module 300B of FIG. 3B, first module 300C of FIG. 3C, first module 300D of FIG. 3D) or another combination of capacitor(s) and inductor(s) that creates resonance.

Figure 4B:
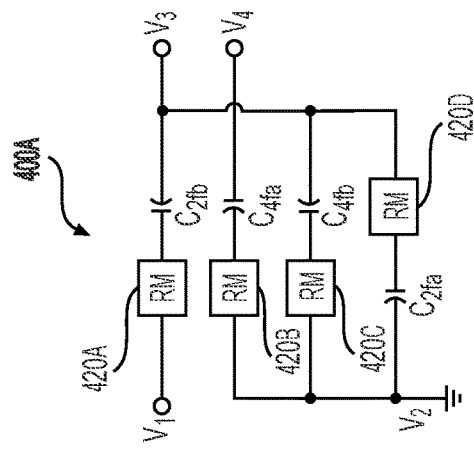
FIGS. 4B and 4C are diagrams illustrating example configurations of the exemplary power converter of FIG. 4A, in accordance with some embodiments of the present disclosure.
Figure 4C:
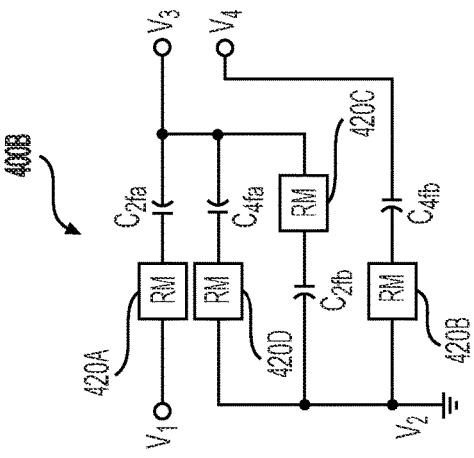
Figure 4A:
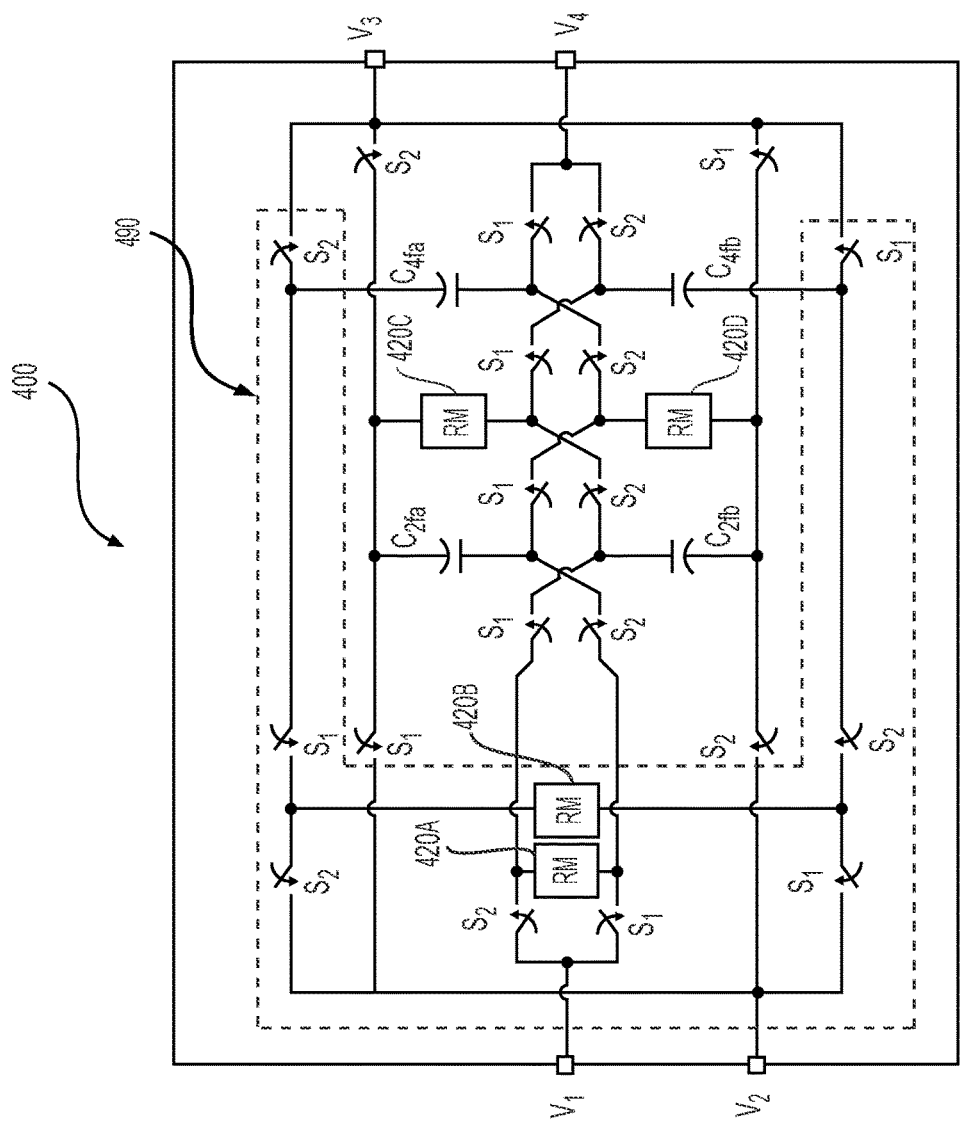
FIG. 4A is a diagram illustrating an exemplary power converter, in accordance with some embodiments of the present disclosure.

FIGS. 4A and 4B are diagrams illustrating example configurations 400A and 400B of the exemplary power converter 400 of FIG. 4, in accordance with some embodiments of the present disclosure. For example, configuration 400A may represent the circuit paths present in converter 400 when switches S1 are closed and switches S2 are open. Similarly, configuration 400B may represent the circuit paths of converter 400 when switches S1 are open and switches S2 are closed.

As shown, each of configurations 400A and 400B may include a first module in series with a capacitor between each terminal. For example, in configuration 400A, input terminal V1 may be connected to output terminal V3 through the series combination of first module 420A and capacitor C2*fb*. Similarly, in configuration 400B, input terminal V1 may be connected to output terminal V3 through first module 420A in series with capacitor C2*fa*. In this design, input terminal V1 may be connected to output terminal V3 through the same first module (e.g., first module 420A, as shown in FIGS. 4A and 4B). A different capacitor may be in series with that first module. For example, in configuration 400A, first module 420A may be in series with capacitor C2*fb*, while configuration 400B may place capacitor C2*fa* in series with first module 420A. In addition to the connection between input terminal V1 and output terminal V3, power converter 400 also features a pair of a capacitor and first module between each path between input terminal V2 and output terminal V3 and V4. This may be made possible by additional circuitry 490 and may offer an improvement over converter 110 of FIG. 1. For example, in configurations 200A and 200B, converter 110 includes only a capacitor between terminals V1 and V3. Also, in configurations 200A and 200B, converter 110 includes a path between terminals V2 and V3 that includes only a first module. Circuitry 490 may allow paths between each terminal to include a first module in series with a capacitor, which may add the beneficial features of symmetry, as well as single-resonance or multi-resonance capability to converter 400.

Power converter 400 may be single-resonance or multi-resonant depending upon the type of first module used. In some embodiments, power converter may have a single resonance frequency. For example, when first module of FIG. 3B is used for each of first modules 420A, 420B, 420C, and 420D in converter 400, converter 400 may have single resonance. In some embodiments, converter 400 may be multi-resonant. For example, when one of first modules 300C or 300D of FIGS. 3C and 3D are used for each of first modules 420A, 420B, 420C, and 420D in converter 400, converter 400 may be multi-resonant. When each of first modules 420A, 420B, 420C, and 420D include only a capacitor without any inductor (e.g., first module 300A of FIG. 3A), the power converter may have no resonant frequency.

FIG. 5A is a diagram illustrating an exemplary power converter 600, in accordance with some embodiments of the present disclosure. Converter 600 may include input terminals V1 and V2 and output terminals V3 and V4, first modules 520A, 520B, 520C, 520D, 520E, 520F, 520G, 520H, 520I, and 520J, switches S1, and switches S2. Although not shown, in some embodiments, converter 600 may be connected to a voltage source and load. For example, a voltage source may be connected across input terminals V1 and V2, and a load may be connected to output terminals V3 and V4. In some embodiments, converter 600 may be bidirectional. Therefore, while the terms "input terminal" and "output terminal" are used, each terminal (or node) may serve to connect to a power supply, a load, or both in embodiments. Although not shown, power converter 500 may be connected to a controller, such as an integrated circuit. The controller may control the state of switches S1 and S2. As shown, converter 500 adds circuitry 590 to converter 110 of FIG. 1 and replaces each capacitor in converter 110 with a first module. The additional circuitry 590 and substitution of first modules for capacitors increases the functionality of converter 110, such as by creating a converter that has multi-resonance and includes two first modules between terminals V1 and V3 and between terminals V2 and V4 in each switch state. Moreover, converter 500 includes symmetry in that each of the switch states includes first modules between each set of terminals in each switch state.

Additional circuity 590 may be similar to additional circuitry 490 of converter 400 of FIG. 4A. One difference, however, may be the groups to which the far left switches belong. As show in FIG. 5A, first module 520A may be connected to terminal V1 through an upper connection via switch S1 and a lower connection via switch S2. In additional circuitry 490 of converter 400, first module 420A may be connected to terminal V1 through two switches as well, however, the upper connection of first module 420A may be connected to terminal V1 through switch S2 (as opposed to switch S1 as in converter 500). Additionally, the lower connection of first module 520A is connected to terminal V1 via switch S1 (as opposed to switch S2 as in converter 500). The inventors recognized that the groupings of these two switches may be swapped depending upon whether the additional circuitry is being connected to a converter circuitry otherwise having an even ratio or an odd ratio. In the case of additional circuitry 490, converter 400 may have an even ratio, which may place the switch connected to the upper connection of first module 420A in the second group of switches (e.g., switches S2), with the switch on the lower connection of first module 420A on the first group of switches (e.g., switches S1). In the case of additional circuitry 590, converter 500 may have an odd ratio, which may place the switch connected to the upper connection of first module 520A in the first group of switches (e.g., switches S1), with the switch on the lower connection of first module 520A on the second group of switches (e.g., switches S2). Similar reasoning may apply to the design of the additional circuitry in other embodiments. For example, the group to which the switches belong that connect to the left-most electrical component in additional circuitry 790 and 1190 may following the same or a similar pattern based on similar reasoning.

Power converter 500 may convert the voltage provided at input terminals V1 and V2 to provide a different voltage at output terminals V3 and V4. For example, the topology of power converter 500 may create an odd voltage conversion ratio, such as a 5:1 ratio of the input voltage (e.g., across input terminals V1 and V2) to the output voltage (e.g., across output terminals V3 and V4). Additional switches and first modules may be added outside of circuitry 590 and connected to it to alter the conversion ratio. For example, another pair of columns of first modules, connected with a similar switching arrangement as first modules 520C, 520G, 520D, and 520H, may be added to increase the voltage ratio to be, for example, a 7:1 ratio. Still further sets of first modules, switches, and connections may be added to further increase the odd voltage ratio (e.g., 9:1, 11:1 ratios). The conversion process may be performed using a switched capacitor network. In some embodiments, two groups of switches may be used to create two alternative configurations of the circuit or two alternative paths. For example, as shown switches S1 and S2 may be used to create two different configurations. In one configuration, switches S1 may be open and switches S2 may be closed. In another configuration, switches S2 may be open and switches S1 may be closed. Other switching configurations may be used consistent with this disclosure.

Power converter 500 may utilize first modules. In some embodiments, power converter 500 may include an even number of first modules, such as ten first modules, as shown. For example, power converter may include first modules 520A, 520B, 520C, 520D, 520E, 520F, 520G, 520H, 520I, and 520J that are connected through a switching topology. The first modules may be one of the example first modules previously discussed in this disclosure (e.g., first module 300B of FIG. 3B, first module 300C of FIG. 3C, first module 300D of FIG. 3D) or another combination of capacitor(s) and inductor(s) that creates resonance. While first module 300A of FIG. 3A may be used for each of first modules 520A, 520B, 520C, 520D, 520E, 520F, 520G, 520H, 520I, and 520J, because that type of first module does not include an inductor, if no other inductor is present in converter 500 (or coupled to converter 500), the resulting converter may not resonate.

FIGS. 5B and 5C are diagrams illustrating example configurations 500A and 500B of the exemplary power converter 500 of FIG. 5A, in accordance with some embodiments of the present disclosure. For example, configuration 500A may represent the circuit paths present in converter 500 when switches S1 are closed and switches S2 are open. Similarly, configuration 500B may represent the circuit paths of converter 500 when switches S1 are open and switches S2 are closed.

As shown, each of configurations 500A and 500B may include two first modules, in series, between each of the input and output terminals. For example, in configuration 500A, input terminal V1 may be connected to output terminal V3 through first modules 520A and 520G in series. Similarly, in configuration 500B, input terminal V1 may be connected to output terminal V3 through first modules 520A and 520C in series. In this design, input terminal V1 may be connected to output terminal V3 through the at least one common first module (e.g., first module 520A in each configuration.

Power converter 500 may be symmetrical. In some embodiments, configurations 500A and 500B may each create paths with the same number of components along each path between each input terminal and output terminal. For example, as shown, V1 and V3 have a two first modules in series connecting them in each of configurations 500A and 500B, while the same applies to the connection between V2 and V4. Moreover, the parallel paths between V2 and V3 each contain two first modules in series. Because the configurations result in symmetrical arrangements (e.g., similar series pairs of first modules connect nodes V1 and V3 in each configuration, and similar series pairs of first modules connect nodes V2 and V4 in each configuration), converter 500 may be considered a symmetrical converter.

As previously discussed, power converter 500 may be single-resonance or multi-resonant depending upon the type of first module used. In some embodiments, power converter may have multiple resonance frequencies. For example, when one of first modules 300B, 300C, or 300D (of FIGS. 3B, 3C, and 3D, respectively) is used for each of first modules 520A, 520B, 520C, 520D, 520E, 520F, 520G, 520H, 520I, and 520J in converter 500, converter 500 may be multi-resonant.

Figure 6B:
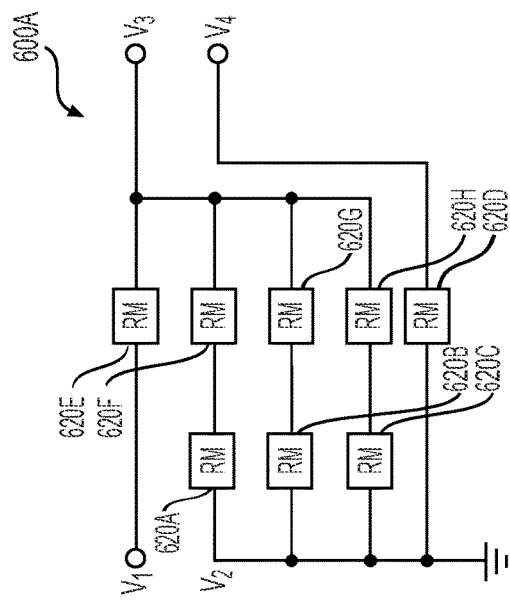
FIGS. 6B and 6C are diagrams illustrating example configurations of the exemplary power converter of FIG. 6A, in accordance with some embodiments of the present disclosure.
Figure 6C:
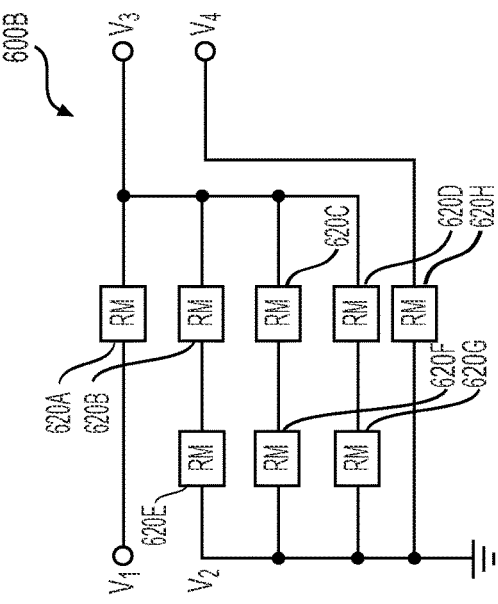
Figure 6A:
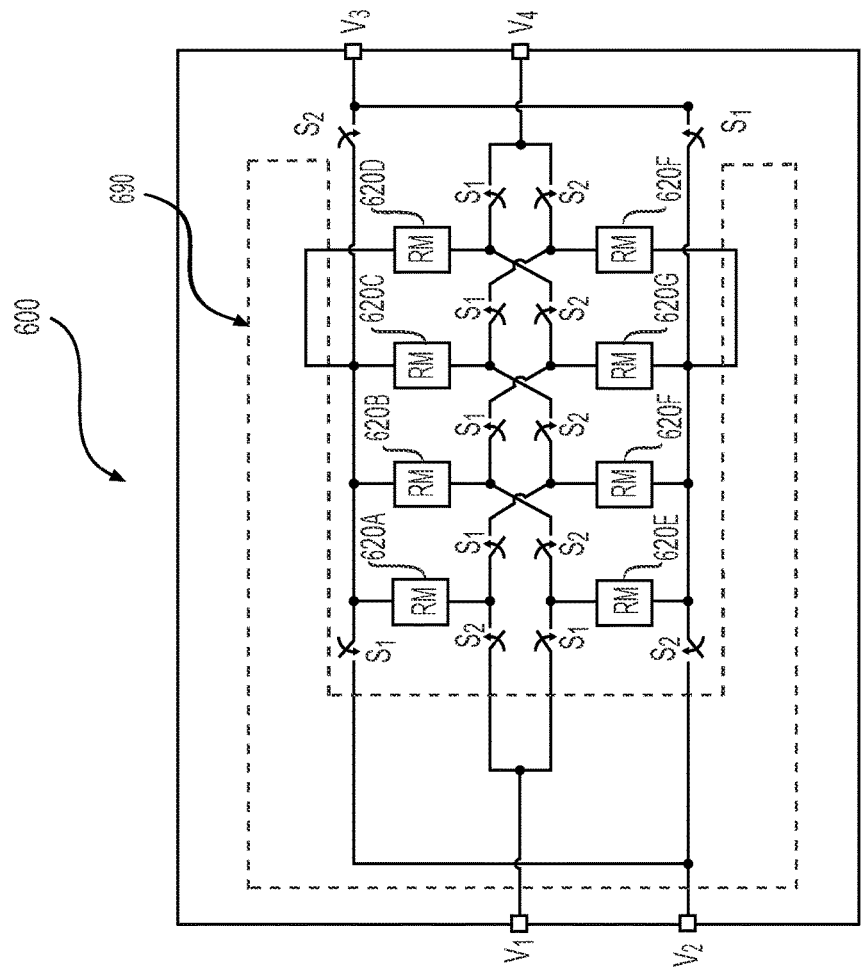
FIG. 6A is a diagram illustrating an exemplary power converter, in accordance with some embodiments of the present disclosure.

FIG. 6A is a diagram illustrating an exemplary power converter 600, in accordance with some embodiments of the present disclosure. Converter 600 may include input terminals V1 and V2 and output terminals V3 and V4, first modules 620A, 620B, 620C, 620D, 620E, 620F, 620G, and 620H, switches S1, and switches S2. Although not shown, in some embodiments, converter 600 may be connected to a voltage source and load. For example, a voltage source may be connected across input terminals V1 and V2, and a load may be connected to output terminals V3 and V4. In some embodiments, converter 600 may be bidirectional. Therefore, while the terms "input terminal" and "output terminal" are used, each terminal (or node) may serve to connect to a power supply, a load, or both in embodiments. Although not shown, power converter 600 may be connected to a controller, such as an integrated circuit. The controller may control the state of switches S1 and S2. As shown, converter 600 adds circuitry 690 to converter 110 of FIG. 1 and replaces each capacitor in converter 110 with a first module. The additional circuitry 690 and substitution of first modules for capacitors increases the functionality of converter 110, such as by creating a converter that has multi-resonance.

Power converter 600 may convert the voltage provided at input terminals V1 and V2 to provide a different voltage at output terminals V3 and V4. For example, the topology of power converter 600 may create an odd voltage conversion ratio, such as a 5:1 ratio of the input voltage (e.g., across input terminals V1 and V2) to the output voltage (e.g., across output terminals V3 and V4). Additional switches and first modules may be added outside of circuitry 690 and connected to it to alter the conversion ratio. For example, another pair of columns of first modules, connected with a similar switching arrangement as first modules 620A, 620E, 620B, and 620F, may be added to increase the voltage ratio to be, for example, a 7:1 ratio. Still further sets of first modules, switches, and connections may be added to further increase the odd voltage ratio (e.g., 9:1, 11:1 ratios). The conversion process may be performed using a switched capacitor network. In some embodiments, two groups of switches may be used to create two alternative configurations of the circuit or two alternative paths. For example, as shown switches S1 and S2 may be used to create two different configurations. In one configuration, switches S1 may be open and switches S2 may be closed. In another configuration, switches S2 may be open and switches S1 may be closed. Other switching configurations may be used consistent with this disclosure.

Power converter 600 may utilize first modules. In some embodiments, power converter 600 may include an even number of first modules, such as eight first modules, as shown. For example, power converter may include first modules 620A, 620B, 620C, 620D, 620E, 620F, 620G, and 620H that are connected through a switching topology. The first modules may be one of the example first modules previously discussed in this disclosure (e.g., first module 300B of FIG. 3B, first module 300C of FIG. 3C, first module 300D of FIG. 3D) or another combination of capacitor(s) and inductor(s) that creates resonance. While first module 300A of FIG. 3A may be used for each of first modules 620A, 620B, 620C, 620D, 620E, 620F, 620G, and 620H, because that type of first module does not include an inductor, if no other inductor is present in converter 600 (or coupled to converter 600), the resulting converter may not resonate.

FIGS. 6B and 6C are diagrams illustrating example configurations 600A and 600B of the exemplary power converter 600 of FIG. 6A, in accordance with some embodiments of the present disclosure. For example, configuration 600A may represent the circuit paths present in converter 600 when switches S1 are closed and switches S2 are open. Similarly, configuration 600B may represent the circuit paths of converter 600 when switches S1 are open and switches S2 are closed.

As shown, each of configurations 600A and 600B may include at least one first module between each of the input and output terminals. For example, in configuration 600A, input terminal V1 may be connected to output terminal V3 through first module 620E. Similarly, in configuration 600B, input terminal V1 may be connected to output terminal V3 through first module 620A. In this design, input terminal V1 may be connected to output terminal V3 through the different first modules in each configuration.

Power converter 600 may be symmetrical. In some embodiments, configurations 600A and 600B may each create paths with the same number of components along each path between each input terminal and output terminal. For example, as shown, V1 and V3 have a single first module connecting them in each of configurations 600A and 600B, while the same applies to the connection between V2 and V4. Moreover, the parallel paths between V2 and V3 each contain two first modules in series. Because the configurations result in symmetrical arrangements (e.g., similar first modules connect nodes V1 and V3 in each configuration, and similar first modules connect nodes V2 and V4 in each configuration), converter 600 may be considered a symmetrical converter.

As previously discussed, power converter 600 may be single-resonance or multi-resonant depending upon the type of first module used. In some embodiments, power converter may have multiple resonance frequencies. For example, when one of first modules 300B, 300C, or 300D (of FIGS. 3B, 3C, and 3D, respectively) is used for each of first modules 620A, 620B, 620C, 620D, 620E, 620F, 620G, and 620H in converter 600, converter 600 may be multi-resonant.

FIG. 7 is a diagram illustrating an exemplary power converter 700, in accordance with some embodiments of the present disclosure. Converter 700 may include input terminals V1 and V2, output terminals V3 and V4, first modules 720A, 720B, 720C, and 720D, capacitors $C2f$, $C4f$, and $C3fa$, $C3fb$, switches S1, and switches S2. Although not shown, in some embodiments, converter 700 may be connected to a voltage source and load. For example, a voltage source may be connected across input terminals V1 and V2, and a load may be connected to output terminals V3 and V4. In some embodiments, converter 700 may be bidirectional. Therefore, while the terms "input terminal" and "output terminal" are used, each terminal (or node) may serve to connect to a power supply, a load, or both in embodiments. Although not shown, power converter 700 may be connected to a controller, such as an integrated circuit. The controller may control the state of switches S1 and S2. As shown, converter 700 adds circuitry 790 to converter 110 of FIG. 1. The additional circuitry 790 increases the functionality of converter 110, such as by converting voltage at even ratios.

Power converter 700 may be considered similar to power converter 400 of FIG. 4. The inventors recognized that each of the first modules of power converter 400 could be replaced with capacitors, and each of the capacitors could be replaced with first modules. For example, based on the demands of a given voltage conversion application, the fly capacitors and first modules may be swapped and still provide an improved switched tank converter that can convert voltage at even ratios and may have single-resonance or multi-resonance. By allowing the positions of the first modules and fly capacitors to be swapped, converter 700 may provide an additional degree of freedom to optimize the layout of the converter.

Power converter 700 may convert the voltage provided at input terminals V1 and V2 to provide a different voltage at output terminals V3 and V4. For example, the topology of power converter 700 may create an even voltage conversion ratio, such as a 4:1 ratio of the input voltage (e.g., across input terminals V1 and V2) to the output voltage (e.g., across output terminals V3 and V4). Additional capacitors, switches, and first modules may be added outside of circuitry 790 and connected to it to alter the conversion ratio. For example, another column of capacitors and another column of first modules, connected with a similar switching arrangement as first modules 720C and 720A and capacitors $C3fa$ and $C3fb$, may be added to increase the voltage ratio (e.g., 6:1, 8:1 ratios). The conversion process may be performed using a switched capacitor network. In some embodiments, two groups of switches may be used to create two alternative configurations of the circuit or two alternative paths. For example, as shown switches S1 and S2 may be used to create two different configurations. In one configuration, switches S1 may be open and switches S2 may be closed. In another configuration, switches S2 may be open and switches S1 may be closed. Other switching configurations may be used consistent with this disclosure. Similar to converter 400, for converter 700, the inventors recognized that additional circuitry 790 may be coupled with the circuitry of converter 110 of FIG. 1 to increase its functionality. The inventors further recognized that the first modules and capacitors may be swapped in the design and still provide similar benefits of even conversion ratios and resonance. In addition to the selection and placement of these components for circuitry 790, the inventors identified particular nodes for connecting the circuitry 790 to converter 110. The inventors further recognized that the first modules and capacitors may be swapped in the design and still provide similar benefits of even conversion ratios and resonance. The combination may result in new functionality, such as even voltage conversion ratios and a converter that has single resonance or is multi-resonant, depending upon the type of first module selected.

Power converter 700 may utilize a combination of capacitors and first modules. In some embodiments, power converter 700 may utilize the same number of first modules as capacitors, such as four capacitors and four first modules, as shown. For example, power converter may include first modules 720A, 720B, 720C, and 720D that are connected through a switching topology with capacitors $C2f$, $C4f$, $C3fa$, and $C3fb$. The capacitors may be the same example capacitors previously discussed in this disclosure. The first modules may be one of the example first modules previously discussed in this disclosure (e.g., first module 300B of FIG. 3B, first module 300C of FIG. 3C, first module 300D of FIG. 3D) or another combination of capacitor(s) and inductor(s) that creates resonance.

FIGS. 8A and 8B are diagrams illustrating example configurations 800A and 800B of the exemplary power converter 700 of FIG. 7, in accordance with some embodiments of the present disclosure. For example, configuration 800A may represent the circuit paths present in converter 700 when switches S1 are closed and switches S2 are open. Similarly, configuration 800B may represent the circuit paths of converter 700 when switches S1 are open and switches S2 are closed.

As shown, each of configurations 800A and 800B may include a first module in series with a capacitor between each terminal. For example, in configuration 800A, input terminal V1 may be connected to output terminal V3 through the series combination of capacitor $C2f$ and first module 720C. Similarly, in configuration 800B, input terminal V1 may be connected to output terminal V3 through capacitor $C2f$ and first module 720A. In this design, input terminal V1 may be connected to output terminal V3 through the same capacitor (e.g., capacitor $C2f$, as shown in FIGS. 8A and 8B). A different first module may be in series with that capacitor. For example, in configuration 800A, capacitor $C2f$ may be in series with first module 720C, while configuration 800B may place capacitor $C2f$ in series with first module 720A. In addition to the connection between input terminal V1 and output terminal V3, power converter 700 also places a pair of a capacitor and first module between each path between input terminal V2 and output terminal V3 and V4.

Power converter 700 may be single-resonance or multi-resonant depending upon the type of first module used. In some embodiments, power converter may have a single resonance frequency. For example, when first module 300B of FIG. 3B is used for each of first modules 720A, 720B, 720C, and 720D in converter 700, converter 700 may have single resonance. In some embodiments, converter 700 may be multi-resonant. For example, when one of the first modules 300C or 300D of FIGS. 3C and 3D are used for each of first modules 720A, 720B, 720C, and 720D in converter 700, converter 700 may be multi-resonant.

Figure 9:
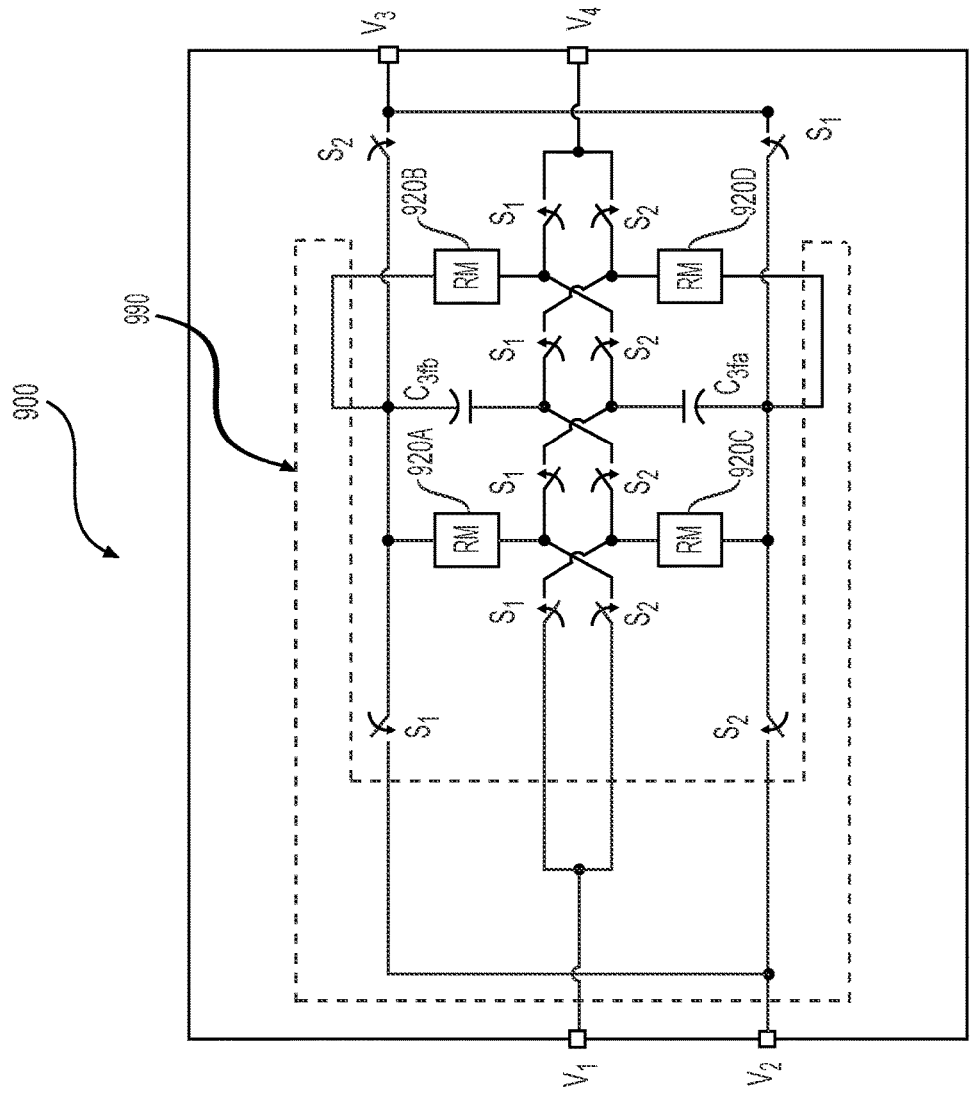
FIG. 9 is a diagram illustrating an exemplary power converter, in accordance with some embodiments of the present disclosure.

FIG. 9 is a diagram illustrating an exemplary power converter 900, in accordance with some embodiments of the present disclosure. Converter 900 may include input terminals V1 and V2, output terminals V3 and V4, first modules 920A, 920B, 920C, and 920D, capacitors $C3fb$ and $C3fa$, switches S1, and switches S2. Although not shown, in some embodiments, converter 900 may be connected to a voltage source and load. For example, a voltage source may be connected across input terminals V1 and V2, and a load may be connected to output terminals V3 and V4. In some embodiments, converter 900 may be bidirectional. Therefore, while the terms "input terminal" and "output terminal" are used, each terminal (or node) may serve to connect to a power supply, a load, or both in embodiments. Although not shown, power converter 900 may be connected to a controller, such as an integrated circuit. The controller may control the state of switches S1 and S2. As shown, converter 900 adds circuitry 990 to converter 110 of FIG. 1. The additional circuitry 990 increases the functionality of converter 110, such as by allowing converter 900 to be multi-resonant. For example, when first modules 920A, 920B, 920C, and 920D are all one of first module 300C of FIG. 3C or first module 300D of FIG. 3D, converter 900 may be multi-resonant.

Power converter 900 may convert the voltage provided at input terminals V1 and V2 to provide a different voltage at output terminals V3 and V4. For example, the topology of power converter 900 may create an even voltage conversion ratio, such as a 4:1 ratio of the input voltage (e.g., across input terminals V1 and V2) to the output voltage (e.g., across output terminals V3 and V4). Additional capacitors, switches, and first modules may be added outside of circuitry 990 and connected to it to alter the conversion ratio. For example, another column of capacitors and another column of first modules, connected with a similar switching arrangement as first modules 920A and 920C and capacitors $C3fa$ and $C3fb$, may be added to increase the voltage ratio (e.g., 6:1, 8:1 ratios). The conversion process may be performed using a switched capacitor network. In some embodiments, two groups of switches may be used to create two alternative configurations of the circuit or two alternative paths. For example, as shown switches S1 and S2 may be used to create two different configurations. In one configuration, switches S1 may be open and switches S2 may be closed. In another configuration, switches S2 may be open and switches S1 may be closed. Other switching configurations may be used consistent with this disclosure. The inventors recognized that additional circuitry 990 may be coupled with a portion of the circuitry of converter 110 of FIG. 1 to increase its functionality. For example, circuitry 990 adds connections to various points within the converter circuit. The inventors identified particular nodes for connecting the circuitry 990 to converter 110. The combination may result in new functionality, such a converter that is multi-resonant, depending upon the type of first module selected.

Power converter 900 may utilize a combination of capacitors and first modules. In some embodiments, power converter 900 may utilize a different number of first modules as capacitors, such as more first modules than capacitors (e.g., two capacitors and four first module first modules, as shown). For example, power converter may include first modules 300C and 300D that are connected through a switching topology with capacitors C3*fa* and C3*fb*. The capacitors may be the same example capacitors previously discussed in this disclosure. The first modules may be one of the example first modules previously discussed in this disclosure (e.g., first module 300C of FIG. 3C, first module 300D of FIG. 3D) or another combination of capacitor(s) and inductor(s) that creates resonance.

Figure 10A:
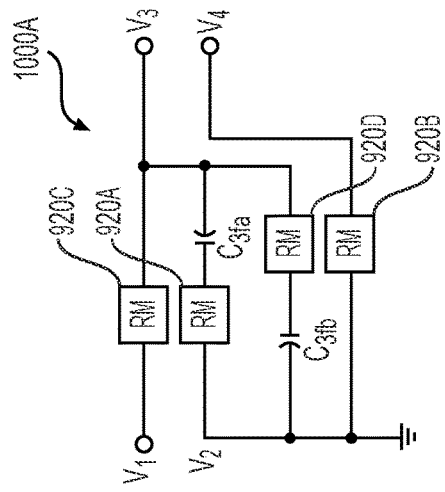
FIGS. 10A and 10B are diagrams illustrating example configurations of the exemplary power converter of FIG. 9, in accordance with some embodiments of the present disclosure.
Figure 10B:
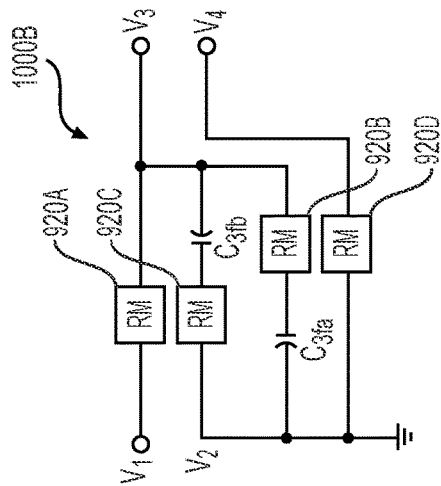

FIGS. 10A and 10B are diagrams illustrating example configurations 1000A and 1000B of the exemplary power converter 900 of FIG. 9, in accordance with some embodiments of the present disclosure. For example, configuration 1000A may represent the circuit paths present in converter 900 when switches S1 are closed and switches S2 are open. Similarly, configuration 1000B may represent the circuit paths of converter 900 when switches S1 are open and switches S2 are closed.

As shown, each of configurations 1000A and 1000B may include at least a first module between each terminal. For example, in configuration 1000A, input terminal V1 may be connected to output terminal V3 through first module 120C. Similarly, in configuration 1000B, input terminal V1 may be connected to output terminal V3 through first module 920A. In this design, input terminal V1 may be connected to output terminal V3 through a different first module in each configuration. In some embodiments, power converter 900 also places a first module between each path between input terminal V2 and output terminal V3 and V4. Like the different capacitance modules between input terminal V1 and output terminal V3, the first module between input terminal V2 and output terminal V4 is also different between configurations 1000A and 1000B. In configuration 1000A, input terminal V2 and output terminal V4 are connected through first module 920B, while in configuration 1000B, the two terminals are connected through first module 920D.

Power converter 900 may improve over existing converters by being multi-resonant. For example, power converter 900 may be single-resonance or multi-resonant depending upon the type of first module used. When first module 300B of FIG. 3B is used for each of first modules 120A, 120B, 120C, and 120D in converter 900, converter 900 may have single resonance. The inventors recognized, however, that converter 900 may be multi-resonant if they use the first modules 300C or 300D of FIGS. 3C and 3D (e.g., a three element or a third-order resonant tank) for each of first modules 920A, 920B, 920C, and 920D in converter 900.

Figure 11:
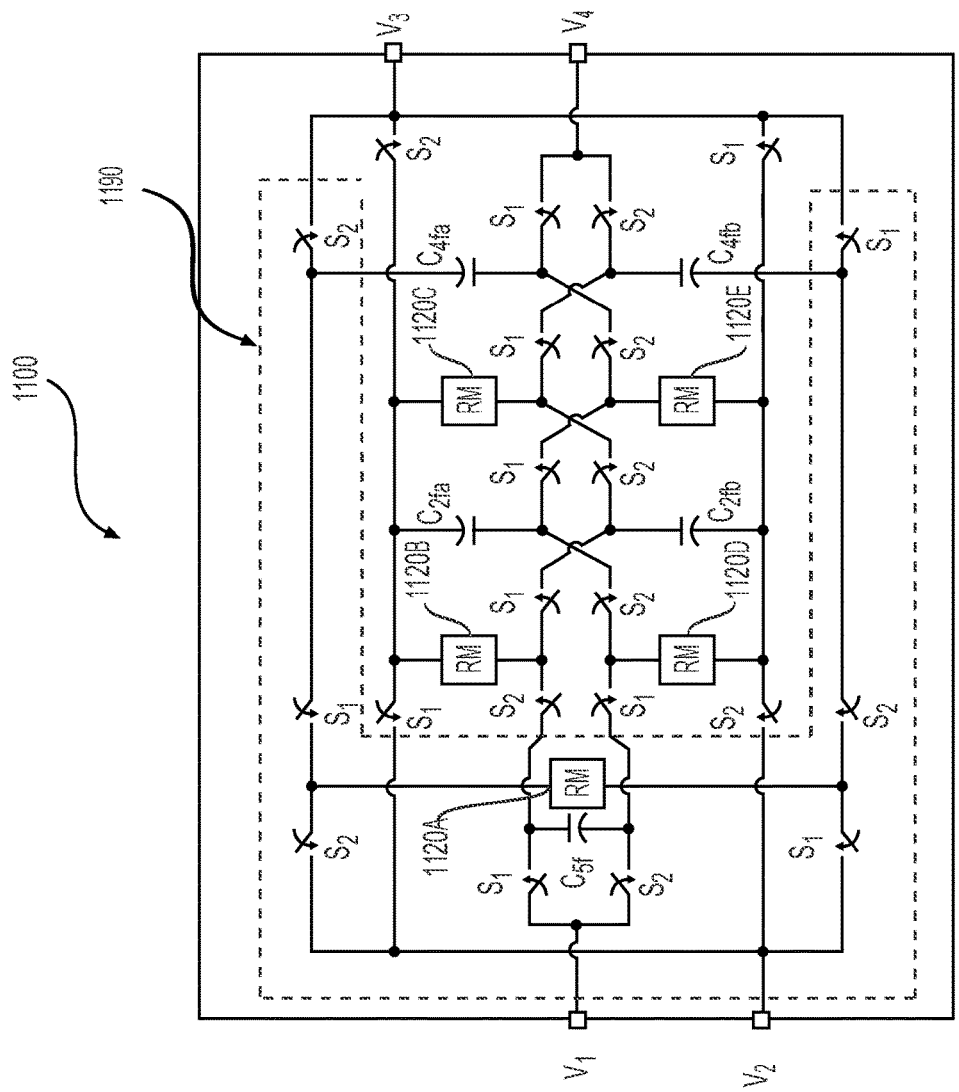
FIG. 11 is a diagram illustrating an exemplary power converter, in accordance with some embodiments of the present disclosure.

FIG. 11 is a diagram illustrating an exemplary power converter 1100, in accordance with some embodiments of the present disclosure. Converter 1100 may include input terminals V1 and V2, output terminals V3 and V4, first modules 1120A, 1120B, 1120C, 1120D, and 1120E, capacitors C5*f*, C2*fa*, C2*fb*, C4*fa*, and C4*fb*, switches S1, and switches S2. Although not shown, in some embodiments, converter 1100 may be connected to a voltage source and load. For example, a voltage source may be connected across input terminals V1 and V2, and a load may be connected to output terminals V3 and V4. In some embodiments, converter 1100 may be bidirectional. Therefore, while the terms "input terminal" and "output terminal" are used, each terminal (or node) may serve to connect to a power supply, a load, or both in embodiments. Although not shown, power converter 1100 may be connected to a controller, such as an integrated circuit. The controller may control the state of switches S1 and S2. As shown, converter 1100 adds circuitry 1190 to converter 110 of FIG. 1. The additional circuitry 1190 increases the functionality of converter 110, such as by making the converter resonate (e.g., single resonance, multi-resonant).

Power converter 1100 may convert the voltage provided at input terminals V1 and V2 to provide a different voltage at output terminals V3 and V4. For example, the topology of power converter 1100 may create an odd voltage conversion ratio, such as a 5:1 ratio of the input voltage (e.g., across input terminals V1 and V2) to the output voltage (e.g., across output terminals V3 and V4). Additional capacitors, switches, and first modules may be added outside of circuitry 1190 and connected to it to alter the conversion ratio. For example, another column of capacitors and another column of first modules, connected with a similar switching arrangement as first modules 1120B and 1120D and capacitors C2*fa* and C2*fb*, may be added to increase the voltage ratio (e.g., 7:1, 9:1 ratios). The conversion process may be performed using a switched capacitor network. In some embodiments, two groups of switches may be used to create two alternative configurations of the circuit or two alternative paths. For example, as shown switches S1 and S2 may be used to create two different configurations. In one configuration, switches S1 may be open and switches S2 may be closed. In another configuration, switches S2 may be open and switches S1 may be closed. Other switching configurations may be used consistent with this disclosure. The inventors recognized that additional circuitry 1190 may be coupled with a portion of the circuitry of converter 110 of FIG. 1 to increase its functionality. For example, circuitry 1190 adds switches to each of switches S1 and S2, along with first module 1120A and capacitor C5*f*. In addition to the selection and placement of these components for circuitry 1190, the inventors identified particular nodes for connecting the circuitry 1190 to converter 110. The combination may result in new functionality, such as a converter that can be single-resonance or multi-resonant, depending upon the type of first module selected.

Power converter 1100 may utilize a combination of capacitors and first modules. In some embodiments, power converter 1100 may utilize the same number of first modules as capacitors, such as four capacitors and four first modules, as shown. For example, power converter may include first modules 1120A, 1120B, 1120C, 1120D, and 1120E that are connected through a switching topology with capacitors C5*f*, C2*fa*, C2*fb*, C4*fa*, and C4*fb*. The capacitors may be the same example capacitors previously discussed in this disclosure. The first modules may be one of the example first modules previously discussed in this disclosure (e.g., first module 300B of FIG. 3B, first module 300C of FIG. 3C, first module 300D of FIG. 3D) or another combination of capacitor(s) and inductor(s) that creates resonance. For example, if first module 300B is used for each of first modules 1120A, 1120B, 1120C, 1120D, and 1120E, converter 1100 may have a single resonance frequency. In other examples, one of first module 300C or 300D may be used, which may cause converter 1100 to be multi-resonant.

Figure 12A:
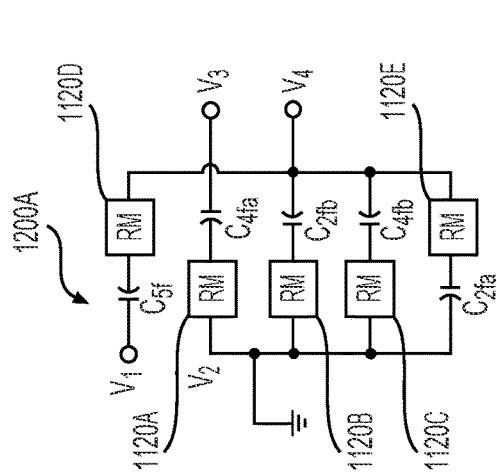
FIGS. 12A and 12B are diagrams illustrating example configurations of the exemplary power converter of FIG. 11, in accordance with some embodiments of the present disclosure.
Figure 12B:
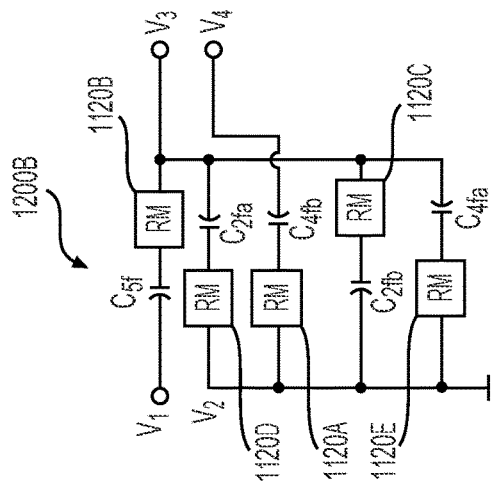

FIGS. 12A and 12B are diagrams illustrating example configurations 1200A and 1200B of the exemplary power converter 1100 of FIG. 11, in accordance with some embodiments of the present disclosure. For example, configuration 1200A may represent the circuit paths present in converter 1100 when switches S1 are closed and switches S2 are open. Similarly, configuration 1200B may represent the circuit paths of converter 1100 when switches S1 are open and switches S2 are closed.

As shown, each of configurations 1200A and 1200B may include a first module in series with a capacitor between each terminal. For example, in configuration 1200A, input terminal V1 may be connected to output terminal V3 through the series combination of first module 1120D and capacitor C5f. Similarly, in configuration 1200B, input terminal V1 may be connected to output terminal V3 through first module 1120B in series with capacitor C5f. In this design, input terminal V1 may be connected to output terminal V3 through the same capacitor (e.g., capacitor C5f as shown in FIGS. 12A and 12B). A different first module may be in series with that first module. For example, in configuration 1200A, first module 1120D may be in series with capacitor C5f, while configuration 1200B may place capacitor C5f in series with first module 1120B. In addition to the connection between input terminal V1 and output terminal V3, power converter 1100 also places a pairing of a capacitor and first module between each path between input terminal V2 and output terminal V3 and V4.

Power converter 1100 may be single-resonance or multi-resonant depending upon the type of first module used. In some embodiments, power converter may have a single resonance frequency. For example, when the first module 300B depicted in FIG. 3B is used for each of first modules 1120A, 1120B, 1120C, 1120D, and 1120E in converter 1100, converter 1100 may have single resonance. In some embodiments, converter 1100 may be multi-resonant. For example, when first module 300C or 300D (e.g., as depicted in FIGS. 3C and 3D, respectively) is used for each of first modules 1120A, 1120B, 1120C, 1120D, and 1120E in converter 1100, converter 1100 may be multi-resonant.

Although not shown, the first modules and capacitors of converter 1100 may be swapped. In embodiments, each of first modules 1120A, 1120B, 1120C, 1120D, and 1120E may be replaced with a capacitor, and each of capacitors C5f, C2fa, C2fb, C4fa, and C4fb may be replaced with a first module. The inventors recognized that, similar to how capacitors and first modules swap positions between converter 400 and converter 700, similar swapping may apply with converter 1100.

Figure 13:
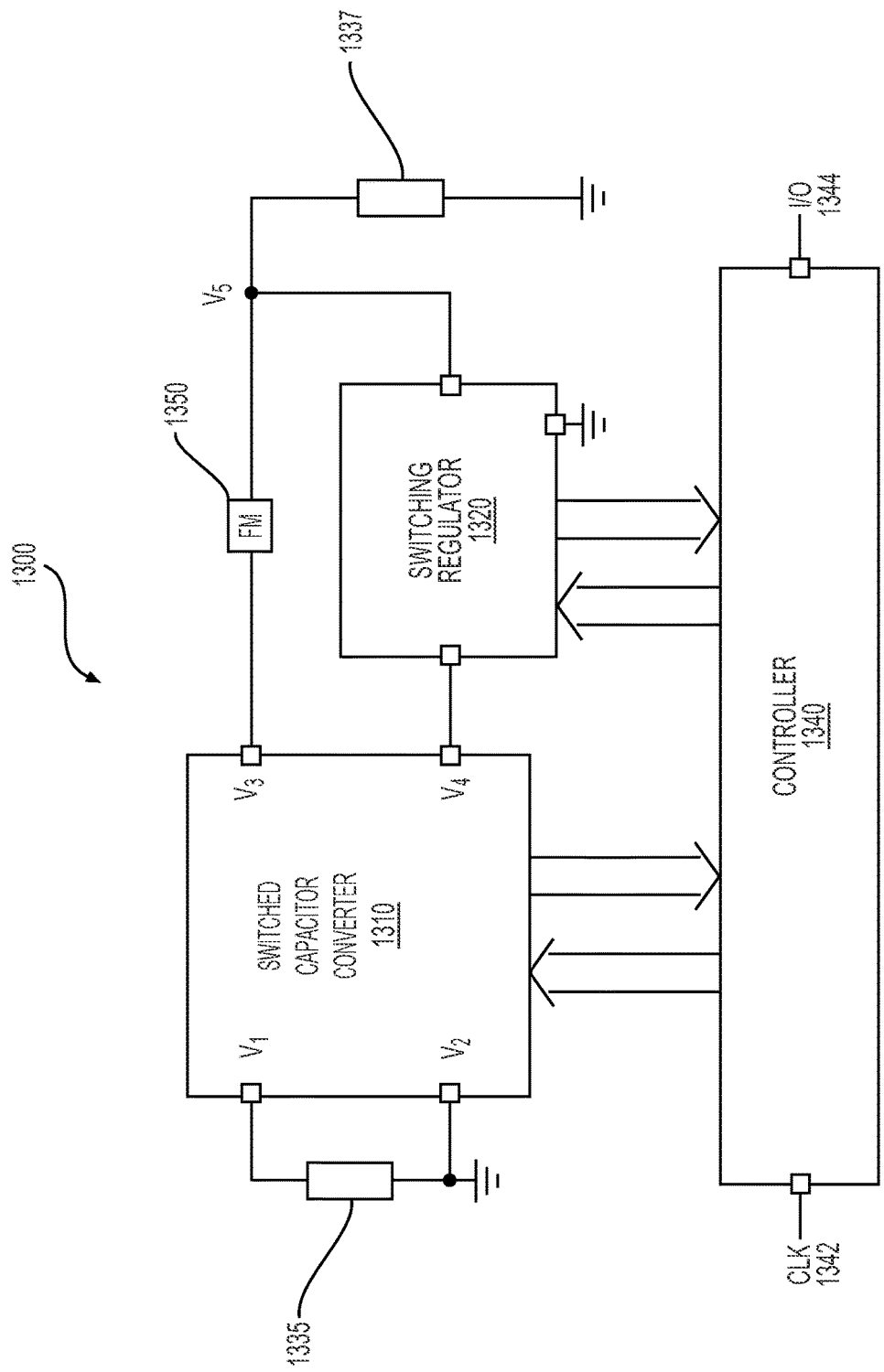
FIG. 13 is a diagram of an example power conversion system, in accordance with some embodiments of the present disclosure.

FIG. 13 is a diagram of an example power conversion system 1300, in accordance with some embodiments of the present disclosure. In some embodiments, system 1300 may include switched capacitor converter 1310. Switched capacitor converter 1310 may include any of the switched capacitor converters discussed in this disclosure. For example, switched capacitor converter 1310 may be any of converters 100, 400, 600, 700, 900, and 1100. Switched capacitor converter 1310 may also be another form of switched capacitor converter consistent with this disclosure. In some embodiments, switched capacitor converter 1310 may be a resonant (e.g., single-resonance, multi-resonance) switched capacitor converter.

In some embodiments, system 1300 may include a voltage source 1335 and load 1337. System 1300 may interface with voltage source 1335 through input terminals V1 and V2 and may provide power to load 1337 through output terminal V5. In some embodiments, although not shown, system 1300 may be bidirectional, and load 1337 may be connected to terminals V1 and V2, with voltage source 135 connected to terminal V4. In other words, in some embodiments, terminal V4 may serve as either an input or an output terminal. In some embodiments, system 1300 may be bidirectional. For example, system 1300 may transfer power in both directions.

In some embodiments system 1300 may include switching regulator 1320. Switching regulator 1320 may be an inductive-based converter (e.g., a buck converter, a boost converter). Coupling switching regulator 1320 to switched capacitor converter 1310 may allow switching regulator 1320 to control the charging and discharging of the capacitors within switched capacitor converter 1310. For example, because capacitors' energy depend on the square of their voltage, when a capacitor's voltage is split across another capacitor, the stored power for the two capacitors combined is decreased by half. Switching regulator 1320 may contain an inductor, which controls in part the charging and discharging of the capacitors within switched capacitor converter 1310 to prevent such energy losses.

In some embodiments, system 1300 may include second module 1350 (shown with label "FM"). Second modules may serve as filters and may be referred to as filter modules. Second module 1350 may include an inductive element to control the charging and discharging of capacitors within switched capacitor converter 1310. For example, an inductor will constrain the current flow, decreasing the energy loss from the charging and discharging of switching capacitors within switched capacitor converter 1310. Specific example filters are discussed below in relation to FIGS. 15A, 15B, 15C, and 15D. And any of the filters depicted in those figures may serve as second module 1350.

In some embodiments, system 1300 may include controller 1340 to control switched capacitor converter 1310 and switching regulator 1320. For example, controller 1340 may send signals to trigger the opening and closing of switches within switched capacitor converter 1310. Controller 1340 may include clock 1342 and input-output 1344 as control signals. For example, clock 1342 and input-out 1344 may be used to determine how controller 1340 operates switched capacitor converter 1310 and switching regulator 1320. For input-output 1344, example input signals may be received from an external microcontroller, microprocessor, or other sensing circuits of a part of the switched capacitor converter or switching regulator. Example output of input-output 1344 may include a fault pin reporting to a microcontroller (or any other number of pins), such as to transmit information in a digital or analog fashion. Although not shown, controller 1340 may include a level shifter and gate drivers to operate switched capacitor converter 1310. In some embodiments, the level shifter and gate driver may reside within switched capacitor converter 1310. In some embodiments, controller may manage the variations in time that may occur in capacitance values thereby providing robustness to the power converter.

In some embodiments, second module 1350 and switching regulator 1320 may be coupled to different terminals of switched capacitor converter 1310. For example, second module 1350 may be connected to terminal V3 of switched capacitor converter 1310, and switching regulator 1320 may be connected to terminal V4 of switched capacitor converter 1310. In this configuration, second module 1350 and switching regulator 1320 may be effectively placed in another path, which may advantageously allow most power to bypass switching regulator 1320 while still allowing switching regulator 1320 to regulate the output of switched capacitor converter 1310.

In some embodiments, system 1300 may resonate even if switched capacitor converter 1310 is not, itself, a resonant switched capacitor converter. For example, switched capacitor converter 1310 may include capacitors that are not paired with inductors, such as when converter 600 of FIG. 6A includes only the first modules of the type depicted in FIG. 3A. Even though such a switch capacitor will not resonate by itself, when paired with second module 1350, system 1300 may still resonate. This is because filter 1350 module can include an inductor (e.g., a resonant inductor) which can pair with a capacitor within a switched capacitor converter 1310. Accordingly, second module 1350 can advantageously be added to an existing non-resonant switched capacitor converter to create a resonant system.

Figure 14:
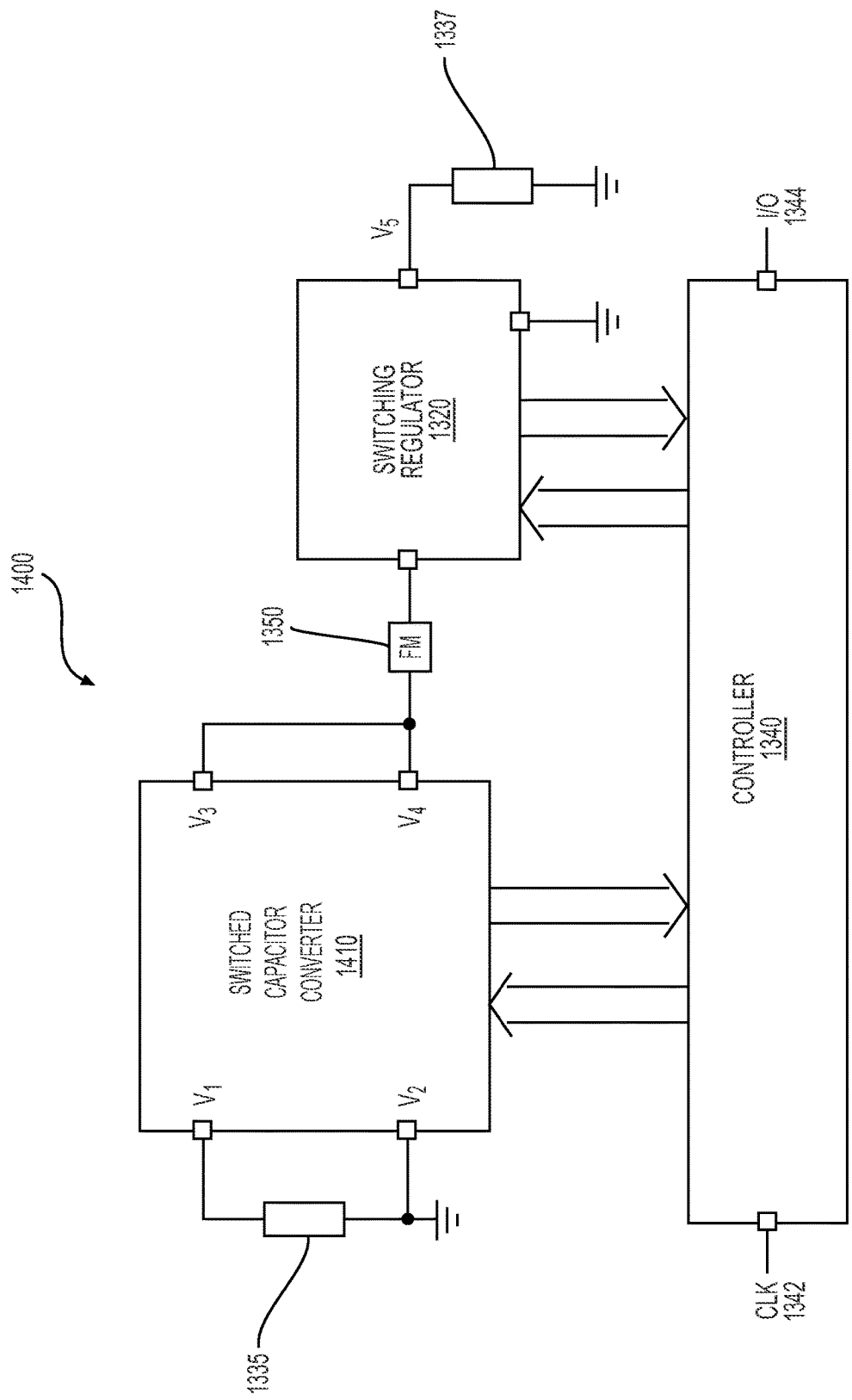
FIG. 14 is a diagram of another example power conversion system, in accordance with some embodiments of the present disclosure.

FIG. 14 is a diagram of another example power conversion system 1400, in accordance with some embodiments of the present disclosure. The components of system 1400 are the same as those of system 1300 and, accordingly, include the same reference numerals. In some embodiments, system 1400 may tie the output terminals of switched capacitor converter 1310 together. In other words, the output of switched capacitor converter 1310 may be shorted, forming a standard Dickson converter.

In some embodiments, system 1400 may include second module 1350 being connected in series between switching regulator 1320 and the shorted output terminals of switched capacitor converter 1310. As with system 1300, second module 1350 of system 1400 may advantageously control the charge and discharge of the capacitors within switched capacitor converter 1310, constraining the current and decreasing energy loss. Although second module 1350 is shown as a separate component from switching regulator 1320 in FIG. 14, system 1400 may include integrating second module 1350 into switching regulator 1320. For example, system 1400 may use the inductive components of switching regulator 1420 to serve the same function as second module 1350. This integration may be appropriate when there is not a need to decouple switching regulator 1320 from switched capacitor converter 1310.

FIGS. 15A, 15B, 15C, and 15D are diagrams illustrating exemplary power converter components, in accordance with some embodiments of the present disclosure. In this disclosure the depicted components may be examples of what is referred to as a second module or a filter module. In each of FIGS. 15A, 15B, 15C, and 15D, the depicted filters include terminals 1510 and 1520 to connect the filters to other components.

Figure 15A:
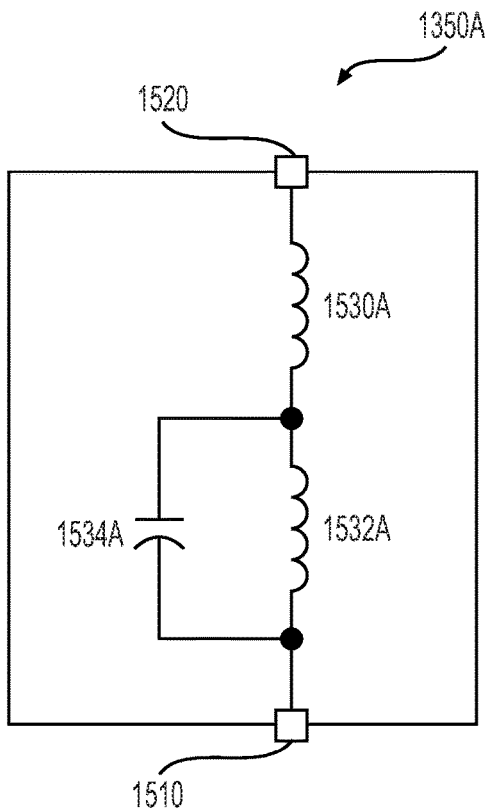
FIGS. 15A, 15B, 15C, and 15D are diagrams illustrating example second modules (e.g., filter modules), in accordance with some embodiments of the present disclosure.

FIG. 15A is a diagram of example second module 1350A, in accordance with some embodiments of the present disclosure. In some embodiments, second module 1350A may include two inductors and a capacitor. For example, as shown, second module 1350A may include inductor 1530A in series with the parallel combination of inductor 1532A and capacitor 1534A.

Figure 15B:
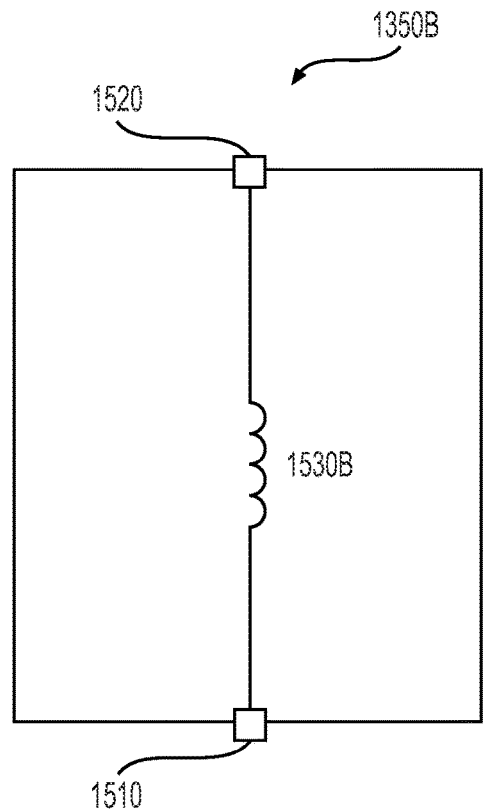
Figure 15C:
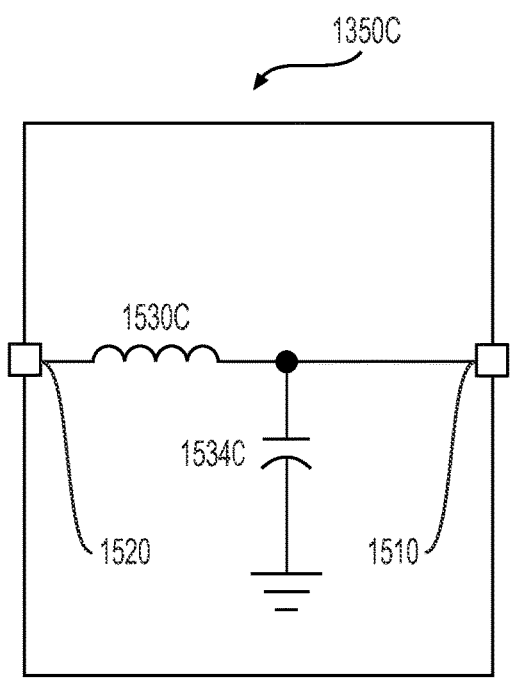

FIG. 15B is a diagram of example second module 1350B, in accordance with some embodiments of the present disclosure. Second module 1350B may include a single inductor (e.g., inductor 1530B, as shown). FIG. 15C is a diagram of example second module 1350C, in accordance with some embodiments of the present disclosure. Second module 1350C may be referred to as an L-C filter. In some embodiments, second module may include one capacitor and one inductor. For example, as shown, second module 1350C may include inductor 1530C with capacitor 1534C connected between one side of inductor 1530C and ground.

Figure 15D:
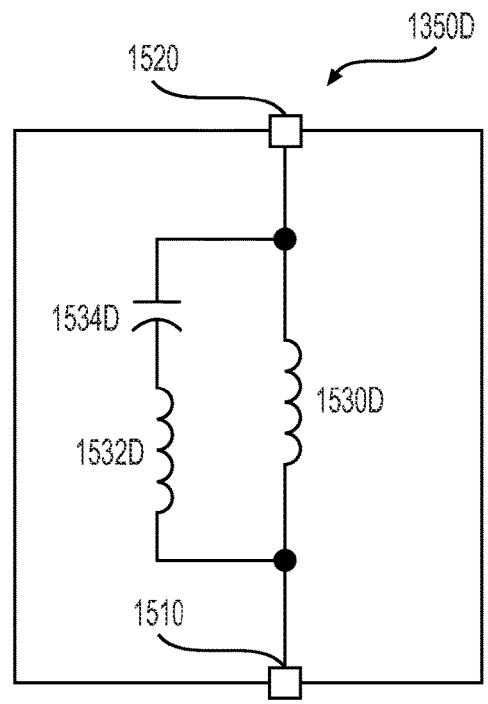

FIG. 15D is a diagram of example second module 1350D, in accordance with some embodiments of the present disclosure. In some embodiments, second module 1350D may include two inductors and one capacitor. For example, as shown, second module 1350D may include inductor 1530D in parallel with the series combination of inductor 1532D and capacitor 1534D.

Second modules 1350A, 1350B, 1350C, and 1350D may be used in conjunction with systems 1300 and 1400, as discussed above.

Disclosed methods and operations may be implemented in hardware, software instructions, or a combination of the two. In some embodiments, functionality (e.g., operations of controller 1340 in FIG. 13 and controller 1440 in FIG. 14) may be implemented in fixed circuitry, such as with the circuitry discussed throughout this disclosure or other application-specific integrated circuitry. In some embodiments, methods and process may be implemented through programmable instructions, such as volatile memory, nonvolatile memory, hard-coded media, and other mechanisms to store software instructions. In some embodiments, methods and process may be implemented in a combination of hardware and software. For example, fixed circuitry may be operated by a programmable controller. The controller may load instructions from on-board or off-board storage in order to control circuitry to collectively perform disclosed methods and process.

Disclosed embodiments may include switched-capacitor power converters. Switched-capacitors may also be referred to as cascade multipliers, switching capacitors, switched capacitors, switch capacitors, charge pumps, and voltage multipliers. The advantages and benefits of switched-capacitor power converters may enable them to be used in a wide array of applications. For example, applications of switched power converters include portable device, mobile computing, and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IOT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, use in electric vehicles of all types (e.g., for drive trains, control systems, and/or infotainment systems), and other devices and systems that utilize portable electricity generating sources and/or require power conversion.

Disclosed embodiments may include switched-capacitor power converters that utilize specific types of capacitors, particularly for the fly capacitors. For example, it may be useful for fly capacitors to have low equivalent series resistance (ESR), low DC bias degradation, high capacitance, and/or small volume. Low ESR may be of particular importance for switched-capacitor power converters that incorporate additional switches and fly capacitors to increase the number of voltage levels. Disclosed embodiments may include a particular capacitor based on a consideration of specifications for power level, efficiency, size, etc. Various types of capacitor technologies may be used, including ceramic (including multi-layer ceramic capacitors (MLCC)), electrolytic capacitors, film capacitors (including power film capacitors), and IC-based capacitors. Capacitor dielectrics may vary as needed for particular applications, and may include dielectrics that are paraelectric, such as silicon dioxide ($SiO_2$), hafnium dioxide ($HFO_2$), or aluminum oxide $Al_2O_3$. In addition, switched-capacitor power converter designs may beneficially utilize intrinsic parasitic capacitances (e.g., intrinsic to the power FETs) in conjunction with or in lieu of designed capacitors to reduce circuit size and/or increase circuit performance. Disclosed embodiments may also select capacitors for switched capacitor converters based on capacitor component variations, reduced effective capacitance with DC bias, and ceramic capacitor temperature coefficients (e.g., minimum and maximum temperature operating limits, and capacitance variation with temperature).

Similarly, in various embodiments of switched-capacitor power converters, it may be beneficial to use specific types of inductors. For example, disclosed embodiments may include inductors that have low DC equivalent resistance, high inductance, and small volume to increase performance.

Disclosed embodiments may include one or more controllers to control, for example, the startup and operation of disclosed embodiments. Controller(s) may be implemented as a microprocessor, a microcontroller, a digital signal processor (DSP), register-transfer level (RTL) circuitry, and/or combinatorial logic.

Disclosed embodiments may include one or more MOSFETs. In embodiments, a MOSFET may refer to any field effect transistor (FET) having an insulated gate whose voltage determines the conductivity of the transistor. In some embodiments, MOSFETS may encompass insulated gates having a metal or metal-like, insulator, and/or semiconductor structure. The metal or metal-like structures may include at least one electrically conductive material (such as aluminum, copper, or other metal, or highly doped polysilicon, graphene, or other electrical conductor). The insulator structures may include at least one insulating material (such as silicon oxide or other dielectric material). The semiconductor structures may include at least one semiconductor material.

Disclosed embodiments can meet a wide variety of specifications and may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. Fabrication in CMOS using SOI or SOS processes may enable circuits with low power consumption, the ability to withstand high power signals during operation due to FET stacking, good linearity, and high frequency operation (e.g., radio frequencies up to and exceeding 300 GHz). Monolithic IC implementation may be useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Disclosed embodiments may adjust component voltage, current, and power handling capabilities as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present disclosure may be used alone or in combination with other components, circuits, and devices. Embodiments may be fabricated as integrated circuits (ICs), which may be encased in IC packages and/or in modules for ease of handling, manufacture, and/or improved performance. For example, IC embodiments of the present disclosure may be used in modules in which one or more of such ICs are combined with other circuit components or blocks (e.g., filters, amplifiers, passive components, and possibly additional ICs) into one package. The ICs and/or modules may be then combined with other components, such as on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs may enable a mode of communication, such as wireless communication.

Embodiments may include implementations in hardware or software, or a combination of both (e.g., programmable logic arrays). In some embodiments, various general purpose computing machines may be used with programs written in accordance with the teachings herein. In other embodiments, a special purpose computer or special-purpose hardware (such as integrated circuits) may be used to perform particular functions. Embodiments may be implemented in one or more computer programs (i.e., a set of instructions or codes) executing on one or more programmed or programmable computer systems (which may be of various architectures, such as distributed, client/server, or grid) each including, for example, at least one processor, at least one data storage system (which may include volatile and non-volatile memory and/or storage elements), at least one input device or port, and/or at least one output device or port. Program instructions or code may be applied to input data to perform the functions described herein and generate output information. The output information may be applied to one or more output devices.

Disclosed embodiments may involve computer programs implemented in a computer language (e.g., machine, assembly, or high level procedural, logical, object oriented programming languages or a custom language/script) to communicate with a computer system, and may be implemented in a distributed manner in which different parts of the computation specified by the software are performed by different processors. The computer language may be a compiled or interpreted language. Computer programs implementing certain embodiments may form one or more modules of a larger program or system of programs. Some or all of the elements of the computer program may be implemented as data structures stored in a computer readable medium or other organized data conforming to a data model stored in a data repository.

Disclosed embodiments may include computer program(s) that may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently, or permanently), the storage media or device being readable by a general or special purpose programmable computer for configuring and operating the computer when the storage media or device is read by the computer system to perform the procedures described above. Disclosed embodiments may also be implemented as a non-transitory computer-readable storage medium, configured with a computer program, where the storage medium so configured causes a computer system to operate in a specific or predefined manner to perform the functions described above.

In the specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not to be considered essential features of those embodiments unless the embodiment is inoperative without those elements.

The embodiments may further be described using the following clauses:

1. An integrated circuit (IC) for controlling a switched-capacitor power converter for converting voltage between first and second nodes to voltage between third and fourth nodes for use with a first plurality of switches, a second plurality of switches, a plurality of capacitors, and a plurality of resonance modules, comprising:
   a controller configured to control the first plurality of switches to be closed and the second plurality of switches to be open to electrically connect the first node to the third node through a first one of the plurality of capacitors in series with a first one of the plurality of resonance modules.
2. The integrated circuit of clause 1, wherein each of the plurality of resonance modules comprises a capacitor and an inductor in series with the capacitor.
3. The integrated circuit of clause 1, wherein each of the plurality of resonance modules comprises a first capacitor, a second capacitor, and an inductor connected to each other.
4. The integrated circuit of clause 3, where the first capacitor is in series with the second capacitor, and the inductor is electrically connected in parallel with the first capacitor.
5. The integrated circuit of clause 3, where the first capacitor is in series with the inductor, and the second capacitor is electrically connected in parallel with the first capacitor and the inductor.
6. The integrated circuit of any one of the preceding clauses, wherein the power converter is multi-resonant.
7. The integrated circuit of any one of the preceding clauses, wherein the power converter enables zero-current switching.
8. The integrated circuit of any one of the preceding clauses, wherein a voltage across the third and fourth nodes is an odd ratio of a voltage across the first and second nodes.
9. The integrated circuit of any one of the preceding clauses, wherein a number of the plurality of capacitors and a number of the plurality of resonance modules are equal.
10. The integrated circuit of any one of the preceding clauses, wherein:
    controlling the first plurality of switches to be closed and the second plurality of switches to be open comprises electrically connecting the second node to the fourth node through a third one of the plurality of capacitors in series with a third one of the plurality of resonance modules.
11. A method for controlling a switched-capacitor power converter for converting voltage between first and second nodes to voltage between third and fourth nodes for use with a first plurality of switches, a second plurality of switches, a plurality of capacitors, and a plurality of resonance modules, comprising:
    controlling the first plurality of switches to be closed and the second plurality of switches to be open to electrically connect the first node to the third node through a first one of the plurality of capacitors in series with a first one of the plurality of resonance modules.
12. A switched-capacitor power converter for converting voltage between first and second nodes to voltage between third and fourth nodes, comprising:
    a first plurality of switches;
    a second plurality of switches;
    a plurality of capacitors; and
    a plurality of resonance modules;
    wherein:
    when the first plurality of switches are closed and the second plurality of switches are open, the first node is electrically connected to the third node through a first one of the plurality of capacitors in series with a first one of the plurality of resonance modules.
13. An integrated circuit (IC) for controlling a switched-capacitor power converter for converting voltage between first and second nodes to voltage between third and fourth nodes for use with a first plurality of switches, a second plurality of switches, a plurality of capacitors, and a plurality of resonance modules, comprising:
    a controller configured to control the first plurality of switches to be closed and the second plurality of switches to be open to electrically connect the first node to the third node through a first one of the plurality of resonance modules;
    wherein:
    a ratio of a voltage across the first and second nodes to a voltage across the third and fourth nodes is an even ratio; and
    the power converter is multi-resonant.
14. The integrated circuit of clause 13, wherein the plurality of resonance modules are third-order resonant tanks.
15. The integrated circuit of clause 13, wherein the plurality of resonance modules comprise a first capacitor, a second capacitor, and an inductor connected to each other.
16. The integrated circuit of clause 15, wherein the first capacitor is in series with the second capacitor, and the inductor is electrically connected in parallel with the first capacitor.
17. The integrated circuit of clause 15, wherein the first capacitor is in series with the inductor, and the second capacitor is electrically connected in parallel with the first capacitor and the inductor.
18. The integrated circuit of any one of clauses 13-17, wherein the power converter enables zero-current switching.
19. The integrated circuit of any one of clauses 13-18, wherein the ration of the voltage across the first and second nodes to the voltage across the third and fourth nodes is a 4:1 ratio.
20. The integrated circuit of any one of clauses 13-19, wherein:
    the plurality of capacitors comprises two capacitors; and
    the plurality of resonance modules comprises four resonance modules.

21. The integrated circuit of any one of clauses 13-20, wherein a number of the resonance modules is greater than a number of the plurality of capacitors.
22. The integrated circuit of any one of clauses 13-21, wherein:
controlling the first plurality of switches to be closed and the second plurality of switches to be open comprises electrically connecting the second node to the fourth node through a third one of the plurality of resonance modules.
23. A method for controlling a switched-capacitor power converter for converting voltage between first and second nodes to voltage between third and fourth nodes for use with a first plurality of switches, a second plurality of switches, a plurality of capacitors, and a plurality of resonance modules, comprising:
controlling the first plurality of switches to be closed and the second plurality of switches to be open to electrically connect the first node to the third node through a first one of the plurality of resonance modules;
wherein:
a ratio of a voltage across the first and second nodes to a voltage across the third and fourth nodes is an even ratio; and
the power converter is multi-resonant.
24. A switched-capacitor power converter for converting voltage between first and second nodes to voltage between third and fourth nodes, comprising:
a first plurality of switches;
a second plurality of switches;
a plurality of capacitors; and
a plurality of resonance modules;
wherein:
when the first plurality of switches are closed and the second plurality of switches are open, the first node is electrically connected to the third node through a first one of the plurality of capacitors in series with a first one of the plurality of resonance modules;
wherein
a ratio of an input voltage across the input nodes to an output voltage across the output nodes is an even ratio; and
the power converter is multi-resonant.
25. An integrated circuit (IC) for controlling a switched-capacitor power converter for converting voltage between first and second nodes to voltage between third and fourth nodes for use with a first plurality of switches, a second plurality of switches, and a plurality of resonance modules, comprising:
a control configured to control the first plurality of switches to be closed and the second plurality of switches to be open to electrically connect the first node to the third node through a first one of the plurality of resonance modules;
wherein the power converter is multi-resonant.
26. The integrated circuit of clause 25, wherein the plurality of resonance modules comprises a capacitor and an inductor.
27. The integrated circuit of clause 26, wherein the inductor is in series with the capacitor.
28. The integrated circuit of clause 25, wherein the plurality of resonance modules comprise a first capacitor, a second capacitor, and an inductor.
29. The integrated circuit of clause 28, wherein the first capacitor is in series with the second capacitor, and the inductor is electrically connected in parallel with the first capacitor.
30. The integrated circuit of clause 25, where the first capacitor is in series with the inductor, and the second capacitor is electrically connected in parallel with the first capacitor and the inductor.
31. The integrated circuit of any one of clauses 25-30, wherein the power converter enables zero-current switching.
32. The integrated circuit of any one of clauses 25-31, wherein a ratio of the voltage at the input nodes to a voltage at the output nodes is an even ratio.
33. The integrated circuit of any one of clauses 25-32, wherein the ratio of the voltage at the input nodes to a voltage at the output nodes is a 4:1 ratio.
34. The integrated circuit of any one of clauses 25-33, wherein the plurality of resonance modules comprises eight resonance modules.
35. The integrated circuit of claim any one of clauses 25-34, wherein
controlling the first plurality of switches to be closed and the second plurality of switches to be open comprises electrically connecting the second node to the fourth node through a third one of the plurality of resonance modules.
36. A method for controlling a switched-capacitor power converter for converting voltage between first and second nodes to voltage between third and fourth nodes for use with a first plurality of switches, a second plurality of switches, and a plurality of resonance modules, comprising:
controlling the first plurality of switches to be closed and the second plurality of switches to be open to electrically connect the first node to the third node through a first one of the plurality of resonance modules;
wherein the power converter is multi-resonant.
37. A switched-capacitor power converter for converting voltage between first and second nodes to voltage between third and fourth nodes, comprising:
a first plurality of switches;
a second plurality of switches; and
a plurality of resonance modules;
wherein:
when the first plurality of switches are closed and the second plurality of switches are open, the first node is electrically connected to the third node through a first one of the plurality of resonance modules; and
the power converter is multi-resonant.
38. The integrated circuit of anyone of clauses 1-10, 13-22, and 25-35, wherein the controller is further configured to control a switching regulator that is electrically connected to the fourth node and a filter module, the filter module being electrically connected to the third node.
39. The integrated circuit of clause 38, wherein the fourth node is electrically connected to the switching regulator.
40. The integrated circuit system of clause 39, wherein the filter module and the switching regulator are electrically connected in parallel.
41. The integrated circuit of clause 38, wherein the filter module is further connected to the fourth node.
42. The integrated circuit of clause 41, wherein the filter module is connected in series with the switching regulator.
43. The integrated circuit of any one of clauses 28-42, wherein the filter module comprises a first inductor.
44. The integrated circuit of clause 43, wherein the filter module further comprises a second inductor and a capacitor.

45. The integrated circuit of clause 44, wherein the first inductor and the second inductor are electrically connected in parallel, and the capacitor of the filter module is electrically connected in series with the first inductor.

46. The integrated circuit of clause 44, wherein the first inductor and the second inductor are electrically connected in series, and the capacitor of the filter module is electrically connected in parallel across the first inductor.

48. The integrated circuit system of clause 43, wherein the filter module further comprises a capacitor connected to the first inductor and to ground.

49. An integrated circuit (IC) for controlling a switched-capacitor power converter for converting voltage between first and second nodes to voltage between third and fourth nodes for use with a first plurality of switches, a second plurality of switches, and a plurality of resonance modules, comprising:
a controller configured to control the first plurality of switches to be closed and the second plurality of switches to be open to electrically connect the first node to the third node through a first one of the plurality of resonance modules in series with a second one of the plurality of resonance modules.

36. A method for controlling a switched-capacitor power converter for converting voltage between first and second nodes to voltage between third and fourth nodes for use with a first plurality of switches, a second plurality of switches, and a plurality of resonance modules, comprising:
controlling the first plurality of switches to be closed and the second plurality of switches to be open to electrically connect the first node to the third node through a first one of the plurality of resonance modules in series with a second one of the plurality of resonance modules.

37. A switched-capacitor power converter for converting voltage between first and second nodes to voltage between third and fourth nodes, comprising:
a first plurality of switches;
a second plurality of switches; and
a plurality of resonance modules;
wherein:
when the first plurality of switches are closed and the second plurality of switches are open, the first node is electrically connected to the third node through a first one of the plurality of resonance modules in series with a second one of the plurality of resonance modules.

38. The integrated circuit (IC) of anyone of clauses 1-10, 13-22, and 25-35, wherein the IC operates as a bidirectional switched capacitor power converter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) for controlling a switched-capacitor power converter for converting voltage between first and second nodes to voltage between third and fourth nodes for use with a first plurality of switches, a second plurality of switches, a plurality of capacitors, and a plurality of resonance modules, comprising:
a controller configured to control the first plurality of switches to be closed and the second plurality of switches to be open to electrically connect the first node to the third node through a first one of the plurality of capacitors in series with a first one of the plurality of resonance modules,
wherein each of the plurality of resonance modules comprises a first capacitor, a second capacitor, and an inductor connected to each other.

2. The integrated circuit of claim 1, wherein each of the plurality of resonance modules comprises a capacitor and an inductor, the inductor being in series with the capacitor of each of the plurality of resonance modules.

3. The integrated circuit of claim 1, where the first capacitor is in series with the second capacitor, and the inductor is electrically connected in parallel with the first capacitor.

4. The integrated circuit of claim 1, where the first capacitor is in series with the inductor, and the second capacitor is electrically connected in parallel with the first capacitor and the inductor.

5. The integrated circuit of claim 1, wherein the power converter is multi-resonant.

6. The integrated circuit of claim 1, wherein the power converter enables zero-current switching.

7. The integrated circuit of claim 1, wherein a voltage across the third and fourth nodes is an odd ratio of a voltage across the first and second nodes.

8. The integrated circuit of claim 1, wherein a number of the plurality of capacitors and a number of the plurality of resonance modules are equal.

9. The integrated circuit of claim 1, wherein the IC operates as a bidirectional switched capacitor power converter.

10. The integrated circuit of claim 1, wherein the controller is further configured to control a switching regulator that is electrically connected to the fourth node and a filter module, the filter module being electrically connected to the third node.

11. The integrated circuit of claim 10, wherein the fourth node is electrically connected to the switching regulator.

12. The integrated circuit system of claim 11, wherein the filter module and the switching regulator are electrically connected in parallel.

13. The integrated circuit of claim 10, wherein the filter module is further connected to the fourth node.

14. The integrated circuit of claim 13, wherein the filter module is connected in series with the switching regulator.

15. The integrated circuit of claim 10, wherein the filter module comprises a first inductor.

16. The integrated circuit of claim 15, wherein the filter module further comprises a second inductor and a capacitor.

17. The integrated circuit of claim 16, wherein the first inductor and the second inductor are electrically connected in parallel, and the capacitor of the filter module is electrically connected in series with the first inductor.

18. The integrated circuit of claim 16, wherein the first inductor and the second inductor are electrically connected in series, and the capacitor of the filter module is electrically connected in parallel across the first inductor.

19. The integrated circuit system of claim 15, wherein the filter module further comprises a capacitor connected to the first inductor and to ground.

20. An integrated circuit (IC) for controlling a switched-capacitor power converter for converting voltage between first and second nodes to voltage between third and fourth nodes for use with a first plurality of switches, a second plurality of switches, a plurality of capacitors, and a plurality of resonance modules, comprising:
- a controller configured to control the first plurality of switches to be closed and the second plurality of switches to be open to electrically connect the first node to the third node through a first one of the plurality of capacitors in series with a first one of the plurality of resonance modules, wherein:
- controlling the first plurality of switches to be closed and the second plurality of switches to be open comprises electrically connecting the second node to the fourth node through a third second one of the plurality of capacitors in series with a second one of the plurality of resonance modules.

21. The integrated circuit of claim 20, wherein each of the plurality of resonance modules comprises a capacitor and an inductor, the inductor being in series with the capacitor of each of the plurality of resonance modules.

22. The integrated circuit of claim 20, wherein each of the plurality of resonance modules comprises a first capacitor, a second capacitor, and an inductor connected to each other.

23. The integrated circuit of claim 22, where the first capacitor is in series with the second capacitor, and the inductor is electrically connected in parallel with the first capacitor.

24. The integrated circuit of claim 22, where the first capacitor is in series with the inductor, and the second capacitor is electrically connected in parallel with the first capacitor and the inductor.

25. The integrated circuit of claim 20, wherein the power converter is multi-resonant.

26. The integrated circuit of claim 20, wherein the power converter enables zero-current switching.

27. The integrated circuit of claim 20, wherein a voltage across the third and fourth nodes is an odd ratio of a voltage across the first and second nodes.

28. The integrated circuit of claim 20, wherein a number of the plurality of capacitors and a number of the plurality of resonance modules are equal.

29. The integrated circuit of claim 20, wherein the IC operates as a bidirectional switched capacitor power converter.

30. A switched-capacitor power converter for converting voltage between first and second nodes to voltage between third and fourth nodes, comprising:
- a first plurality of switches;
- a second plurality of switches;
- a plurality of resonance modules; and
- a controller;
- wherein:
  - when the first plurality of switches are closed and the second plurality of switches are open, the first node is electrically connected to the third node through a first one of the plurality of resonance modules;
  - the power converter is multi-resonant;
  - the controller is further configured to control a switching regulator that is electrically connected to the fourth node and a filter module,
  - the filter module being electrically connected to the third node and comprising a first inductor, a second inductor, and a capacitor.

31. An integrated circuit (IC) for controlling a switched-capacitor power converter for converting voltage between first and second nodes to voltage between third and fourth nodes for use with a first plurality of switches, a second plurality of switches, and a plurality of resonance modules, wherein a first state is defined by the first plurality of switches being closed and the second plurality of switches being open, and a second state is defined by the first plurality of switches being open and the second plurality of switches being closed, the integrated circuit, the integrated circuit comprising:
- a controller configured to control the first plurality of switches to be closed and the second plurality of switches to be open to electrically connect the first node to the third node through a first one of the plurality of resonance modules in series with a second one of the plurality of resonance modules; and
- wherein the switched-capacitor power converter is symmetrical in the first and the second state.

* * * * *